United States Patent
Schilling

(10) Patent No.: US 6,512,784 B2
(45) Date of Patent: Jan. 28, 2003

(54) EFFICIENT SHARING OF CAPACITY BY REMOTE STATIONS USING CIRCUIT SWITCHING AND PACKET SWITCHING

(75) Inventor: Donald L. Schilling, Palm Beach Gardens, FL (US)

(73) Assignee: Linex Technologies, Inc., West Long Branch, NJ (US)

( * ) Notice: Subject to any disclaimer, the term of this patent is extended or adjusted under 35 U.S.C. 154(b) by 0 days.

(21) Appl. No.: 09/795,181

(22) Filed: Mar. 1, 2001

(65) Prior Publication Data

US 2002/0150066 A1 Oct. 17, 2002

(51) Int. Cl.[7] .............................................. H04B 1/707
(52) U.S. Cl. ........................ 375/141; 370/342; 370/353; 370/441
(58) Field of Search ................................ 375/130, 141; 370/320, 335, 342, 441, 352, 353, 354

(56) References Cited

U.S. PATENT DOCUMENTS

| | | | |
|---|---|---|---|
| 5,953,331 A | * 9/1999 | Duncan et al | 370/352 |
| 6,005,852 A | * 12/1999 | Kokko et al. | 370/329 |
| 6,085,104 A | 7/2000 | Kowalski et al. | |
| 6,185,197 B1 | 2/2001 | Cheung Yeung et al. | |
| 6,219,343 B1 | * 4/2001 | Honkasalo et al. | 370/335 |
| 6,347,091 B1 | * 2/2002 | Wallentin et al. | 370/235 |

* cited by examiner

Primary Examiner—Don N. Vo
(74) Attorney, Agent, or Firm—David Newman Chartered

(57) ABSTRACT

An improvement to a spread-spectrum, code-division-multiple-access (CDMA) cellular system having multiple circuit-switched (CS) remote stations, multiple packet-switched (PS) remote stations and a base station per cell. The CS-remote station transmits a spread-spectrum CDMA signal, with a chip rate of $f_c$, with a CS-symbol rate of $f_b$, and with a power level $P_{CS}$. The PS-remote station transmits a spread-spectrum CDMA signal with the chip rate of $f_c$, PS-symbol rate $f_p$, and with a power level $P_{PS}$. The power level $P_{PS}$ from the PS-remote station and the power level $P_{CS}$ from the CS-remote station are related by a relation of the CS-symbol rate and the PS-symbol rate to efficiently share system capacity.

38 Claims, 12 Drawing Sheets

EFFICIENT SHARING OF CAPACITY BY REMOTE STATIONS USING CIRCUIT SWITCHING AND PACKET SWITCHING

BACKGROUND OF THE INVENTION

This invention relates to spread-spectrum cellular and non-cellular communications, and more particularly to the $3^{rd}$ generation (3G) system or $4^{th}$ generation (4G) system wherein a remote station may use the 3G or 4G system as either a circuit-switched network or as a packet-switch network.

DESCRIPTION OF THE RELEVANT ART

The $3^{rd}$ generation system employs circuit-switched (CS) remote stations which transmit voice, or data, as continuous data, and packet-switched (PS) remote stations which transmit packets of data in an irregular, bursty manner. The PS-remote stations, for example, might be accessing the Internet, with irregular packets of data. The PS-remote station and the CS-remote station may reside in a common transceiver, or common transmitter and receiver.

If too many CS-remote stations used a particular base station, then the PS-remote stations are blocked from the base station because of lack of available capacity in the spread-spectrum channels assigned to the base station. When a PS-remote station enters the cell, this PS-remote station initially may transmit too much power and jam the transmissions from the CS-remote stations. If a power ramp-up procedure were used by the PS-remote station in order to avoid jamming the CS-remote stations, then the header portion of a packet from the PS-remote station typically is sent several times until a link is established, which increases the duration of the packet and significantly reduces the efficiency of a packet-switched system.

SUMMARY OF THE INVENTION

A general object of the invention is efficient sharing of system capacity of a 3G system cell, or a 4G system cell, between CS-remote stations and PS-remote stations.

Another object of the invention is to allow the PS-remote station to be located within the system so that calls to the PS-remote station go to the correct base station for transmission to the mobile PS-remote station.

According to the present invention, as embodied and broadly described herein, an improvement to a spread-spectrum, code-division-multiple-access (CDMA) system is provided, comprising one or more cells, with each cell containing multiple circuit-switched (CS) remote stations, and multiple packet-switched (PS) remote stations and a base station capable of transmitting circuit-switched signals and packet-switched signals. A CS-remote station transmits a spread-spectrum CDMA signal, with a chip rate $f_c$, with a CS-symbol rate of $f_b$, and with a power level $P_{CS}$. A PS-remote station transmits a spread-spectrum CDMA signal with the chip rate of $f_c$, with a PS-symbol rate $f_p$, and with a power level $P_{PS}$.

Assume that a plurality of CS-remote stations communicates with a particular base station. A PS-remote station can communicate with the base station provided that (1) a packet channel is available, (2) there is available capacity in the spread-spectrum channels at the base station, (3) the required data rate is available, (4) the base station provides the PS-remote station a chip-sequence signal for communicating with the base station, and (5) the base station provides the PS-remote station a power level for the PS-remote station to transmit to the base station. For efficient sharing of system capacity in the spread-spectrum channels at the base station, between the CS-remote station and the PS-remote station, the power level $P_{PS}$ from the PS-remote station and the power level $P_{CS}$ from the CS-remote station are related by: $E=P_{PS}/f_p=P_{CS}/f_b$, in which the energies E are the same, or $P_{PS}/f_p=kP_{CS}/f_b$, in which the energies E differ by a factor k. If $k \neq 1$, then the error rates in the circuit switched system will differ from the error rates in the packet switched system.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
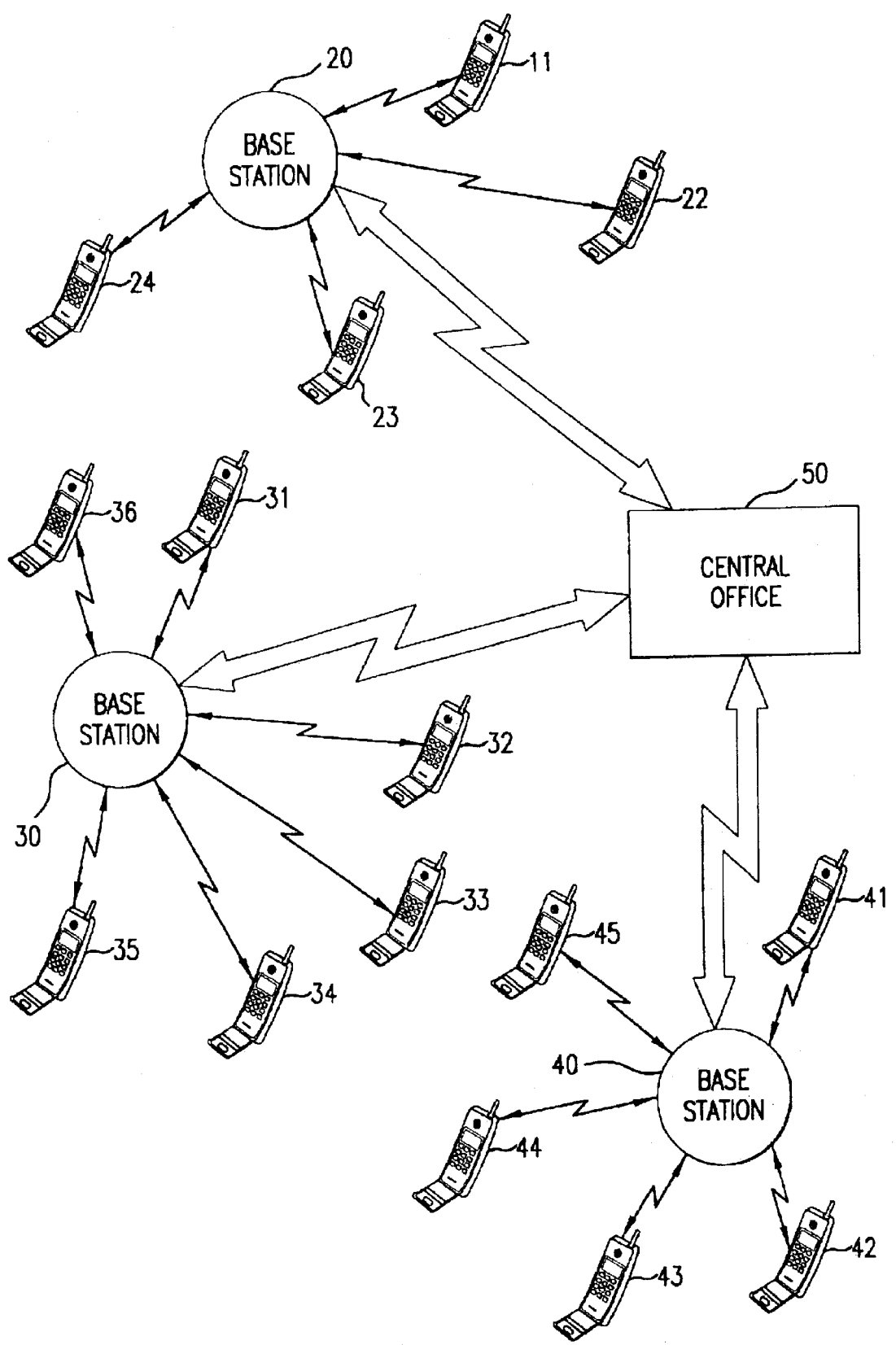
FIG. 1 illustrates a base station communicating with several circuit-switched remote stations and a packet-switched remote station in a star network.

Reference now is made in detail to the present preferred embodiments of the invention, examples of which are illustrated in the accompanying drawings, wherein like reference numerals indicate like elements throughout the several views.

The present invention provides an improvement to a spread-spectrum, code-division-multiple-access (CDMA) system, having one or more cells, with each cell including a plurality of circuit-switched (CS) remote stations and a plurality of packet-switched (PS) remote stations communicating with a base station. The base station is in a conventional star network, or a distributed network, communicating with a central office. Each CS-remote station communicates with the base station using a spread-spectrum CDMA signal, and transmits a spread-spectrum CDMA signal with power $P_{CS}$. The power $P_{CS}$ is proportional to transmitted data rate of the CS-remote station. The PS-remote station transmits in a packet mode, and is assumed to transmit a spread-spectrum CDMA packet signal, so that power $P_{PS}$ is sufficient to ensure that the energy per symbol is $E_P = P_{PS}/f_p$.

More particularly, the present invention pertains to a cellular structure or environment with each cell containing a base station communicating with a plurality of CS-remote stations and PS-remote stations, using spread-spectrum modulation. The present invention preferably is for packet data, with data being sent between a CS-remote station or a PS-remote station, and a base station, as packet signals. A CS-remote station might be a hand-held unit or telephone or computer, or other device which may be stationery or in motion. A PS-remote station might be a connection to a hand-held unit or telephone or a computer or other modem, or other device which may be stationery or in motion.

A spread-spectrum signal, as used herein, typically includes a data signal, multiplied by a chip-sequence signal, and multiplied by a carrier signal. The data signal represents a sequence of data bits. The chip-sequence signal represents a sequence of chips, as normally used in a direct sequence, spread-spectrum signal. The carrier signal is at a carrier frequency, and raises the product of the data signal and the chip-sequence signal, to the carrier frequency. For synchronization, the data signal typically is a constant value, for example, a series of "one" bits, or has very slowly time-varying data. For a PS-remote station, the spread-spectrum signal is a packet, with a header followed by data. For a CS-remote station, the spread-spectrum signal may be a packet, with a header followed by data, or a plurality of spread-spectrum channels, with one of the spread-spectrum channels used for synchronization.

A particular spread-spectrum channel is defined by a particular chip-sequence signal, as is well known in the art. For the case of the packet, synchronization is performed on the header, as is well-known in the art. For a dedicated spread-spectrum channel for synchronization, synchronization is performed using the dedicated channel.

The base station is assumed to transmit to the plurality of remote stations at a first frequency $f_1$, also known as a carrier frequency of the base station transmitter. The plurality of remote stations is assumed to transmit to the base station at a second frequency $f_2$, also know as the carrier frequency of the remote station transmitters. For frequency division duplex operation, the second frequency $f_2$ is different from the first frequency $f_1$, and typically outside the correlation bandwidth of the first frequency $f_1$. For time division duplex (TDD) operation, the second frequency $f_2$ is the same as the first frequency $f_1$. The present invention works with either a FDD CDMA system or a TDD CDMA system.

A particular channel from the base station to a remote station is defined or determined by a particular chip-sequence signal, as is well known in the art for direct-sequence (DS) code-division-multiple access (CDMA) systems. A particular channel from a particular remote station to the base station is defined or determined by a particular chip-sequence signal, as is well known in CDMA systems.

CDMA Network Architecture

The improvement to a method and system of the instant invention provides efficient sharing of capacity in the spread-spectrum channels between CS-remote stations and PS-remote stations in a spread-spectrum CDMA network. The spread-spectrum, CDMA network may be a star network or a distributed network.

As illustratively shown in FIG. 1, a star network, as presently employed for cellular networks, is used to communicate data between a central office 50 and a plurality of remote stations (RS). The plurality of remote stations include a plurality of CS-remote stations and a plurality of PS-remote stations. The term remote station, as used herein, refers in general to a remote station which may be a CS-remote station or a PS-remote station. A particular remote station may include both, a CS-remote station and a PS-remote station. The CS-remote station and the PS-remote station may share common transmitter and common receiver subsystems or components. The prefixes CS and PS are added to the term remote station, when specifically referring to a circuit-switched remote station and a packet-switched remote station, respectively.

A plurality of base stations 20, 30, 40, communicate directly with the central office 50. A first base station 20 communicates data to and from a first plurality of remote stations 11, 22, 23, 24. A second base station 30 communicates data to and from a second plurality of remote stations 31, 32, 33, 34, 35, 36. A third base station 40 communicates data to and from a third plurality of remote stations 41, 42, 43, 44, 45.

Figure 2:
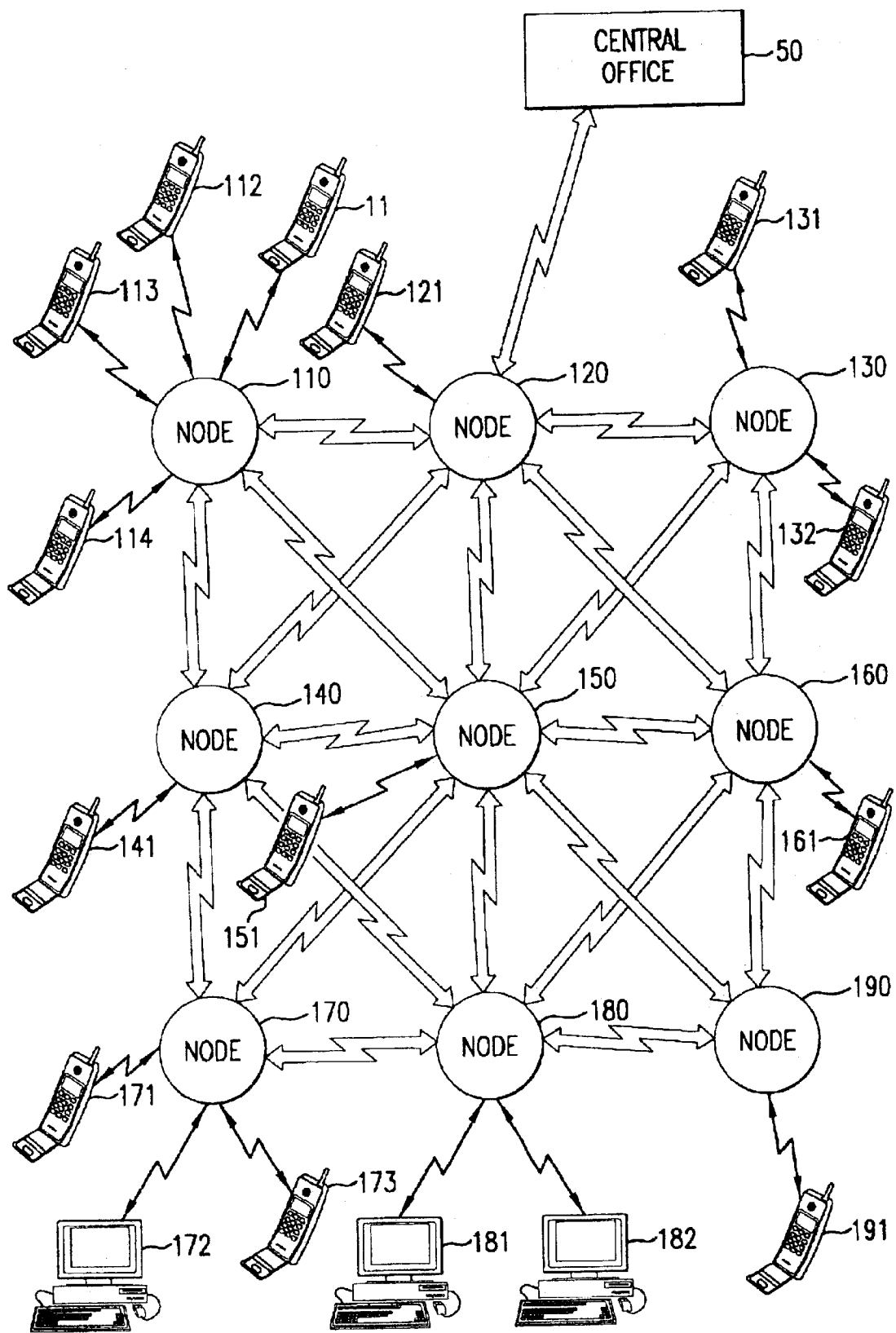
FIG. 2 illustrates several base stations communicating with several circuit-switched remote stations and packet-switched remote stations in a distributed network, spread-spectrum system.
Figure 3:
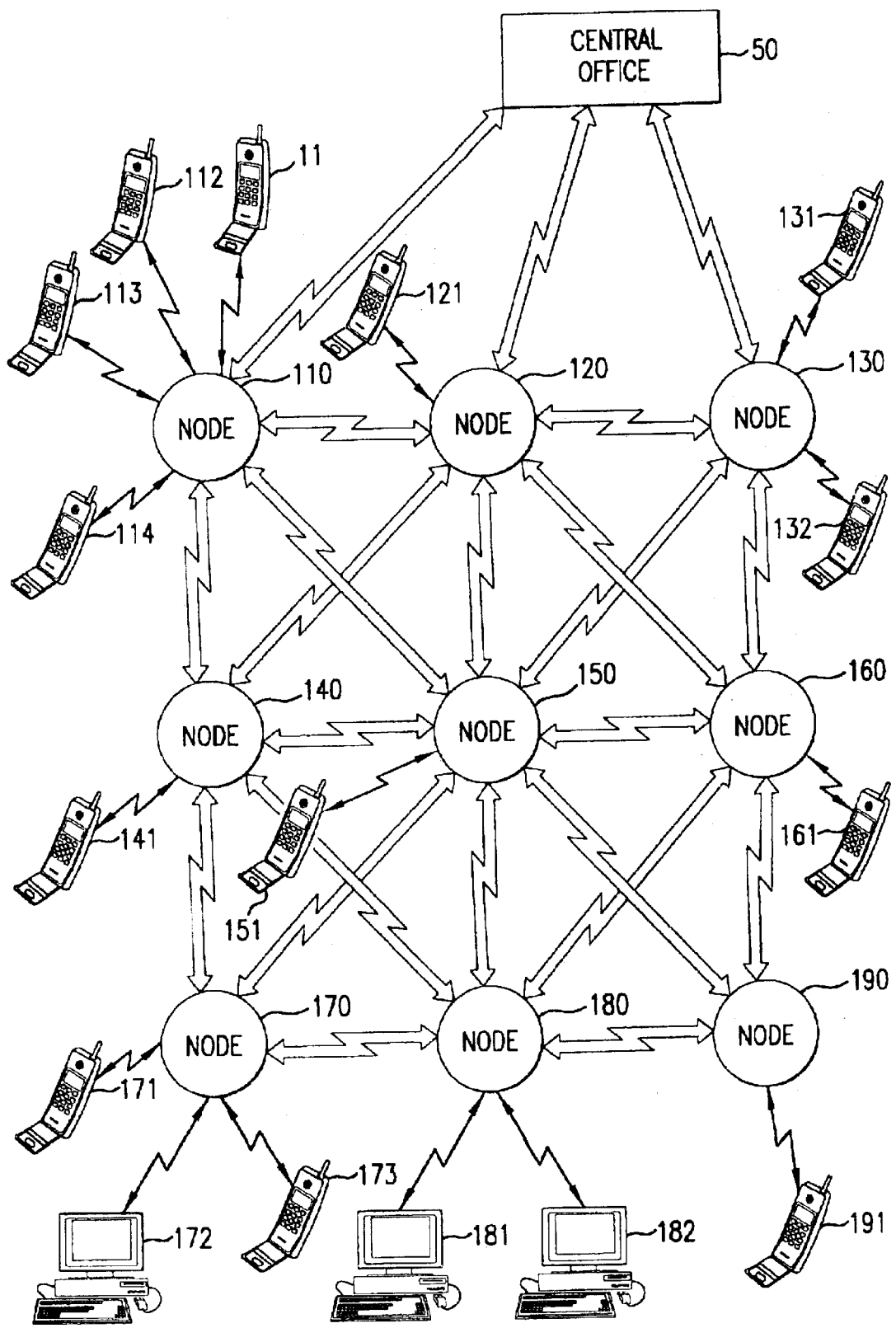
FIG. 3 illustrates several base stations communicating with several circuit-switched remote stations and packet-switched remote stations in a distributed network, spread-spectrum system, with several nodes communicating with a central office.

The distributed network, as illustrated in FIGS. 2 and 3, provides an alternative architecture, for routing packet signals between a central office, through a plurality of nodes, to a remote station. Each of the nodes in a distributed system includes a base station, plus additional system components for the distributed system.

In the exemplary depictions in FIGS. 2 and 3, a distributed network, direct-sequence, spread-spectrum, code-division-multiple-access (CDMA) system, by way of example, comprises a plurality of remote stations and a plurality of nodes 110, 120, 130, 140, 150, 160, 170 180, 190. The plurality of nodes 110, 120, 130, 140, 150, 160, 170 180, 190 forms the distributed network. Each node includes a base station, as referred to in FIG. 1, plus added circuitry to operate in a distributed network. The distributed network plus the plurality of remote stations form the distributed system. The plurality of remote stations includes a plurality of CS-remote stations and a plurality of PS-remote stations, as discussed and defined for the star network. The plurality of nodes 110, 120, 130, 140, 150, 160, 170 180, 190 of FIG. 2, depicts, as an illustration, a first node 110, a second node, 120, a third node 130, a fourth node 140, a fifth node 150, a sixth node 160, a seventh node 170, an eighth node 180 and a ninth node 190.

In the plurality of nodes 110, 120, 130, 140, 150, 160, 170 180, 190, one node, which happens to be labeled the second node 120, is a hub node, which communicates to a central telephone office 50. There may be a plurality of hubs. In an alternative embodiment, as shown in FIG. 3, a set of the plurality of nodes (hubs) communicates to the central office 50. The set of the plurality of nodes (hubs), may include the entire plurality of nodes.

The plurality of nodes 110, 120, 130, 140, 150, 160, 170 180, 190 covers a geographic area. Each node in the plurality of nodes 110, 120, 130, 140, 150, 160, 170 180, 190 forms a micro-cell. A micro-cell typically has a radius much less than one mile.

In the plurality of nodes 110, 120, 130, 140, 150, 160, 170 180, 190, the first node 110 communicates with the second node 120, the fourth node 140 and the fifth node 150. The second node 120 communicates with the first node 110, the third node 130, the fourth node 140, the fifth node 150 and the sixth node 160. The third node communicates with the second node 120, the fifth node 150 and the sixth node 160. The fourth node communicates with the first node 110, the second node 120, the fifth node 150, the seventh node 170 and the eighth node 180. The fifth node communicates with the first node 110, the second node 120, the third node 130, the fourth node 140, the sixth node 160, the seventh node 170, the eighth node 180 and the ninth node 190. The sixth node 160 communicates with the second node 120, the third node 130, the fifth node 150, the eighth node 180 and the ninth node 190. The seventh node 170 communicates with the fourth node 140, the fifth node 150 and the eighth node 180. The eighth node 180 communicates with the fourth node 140, the fifth node 150, the sixth node 160, the seventh node 170 and the ninth node 190. The ninth node communicates with the fifth node 150, the sixth node 160 and the eighth node 180.

FIGS. 2 and 3 show the first node 110 communicating with a first plurality of remote stations 11, 112, 113, 114. The second node 120 communicates with a second plurality of remote stations, with FIGS. 2 and 3 showing a first remote station 121 of the second plurality of remote stations. The third node 130 communicates with a third plurality of remote stations 131, 132 and the fourth node 140, the fifth node 150 and the sixth node 160 communicate with a fourth plurality of remote stations, a fifth plurality of remote stations, and a sixth plurality of remote stations, respectively. FIG. 2 shows the fourth node 140 communicating with a first remote station 141 of the fourth plurality of remote stations, the fifth node 150 communicating with a first remote station 151 of the fifth plurality of remote stations, and the sixth node 160 communicating with a first remote station 161 of the sixth plurality of remote stations. The seventh node 170 and the eighth node 180 are shown communicating with a seventh plurality of remote stations 171, 172, 173 and an eighth plurality of remote stations 181, 182, respectively. The ninth node 190 communicates with a ninth plurality of remote stations, and FIG. 2 shows the ninth node 190 communicating with a first remote station 191 of the ninth plurality of remote stations.

CDMA Base Station

Figure 4:
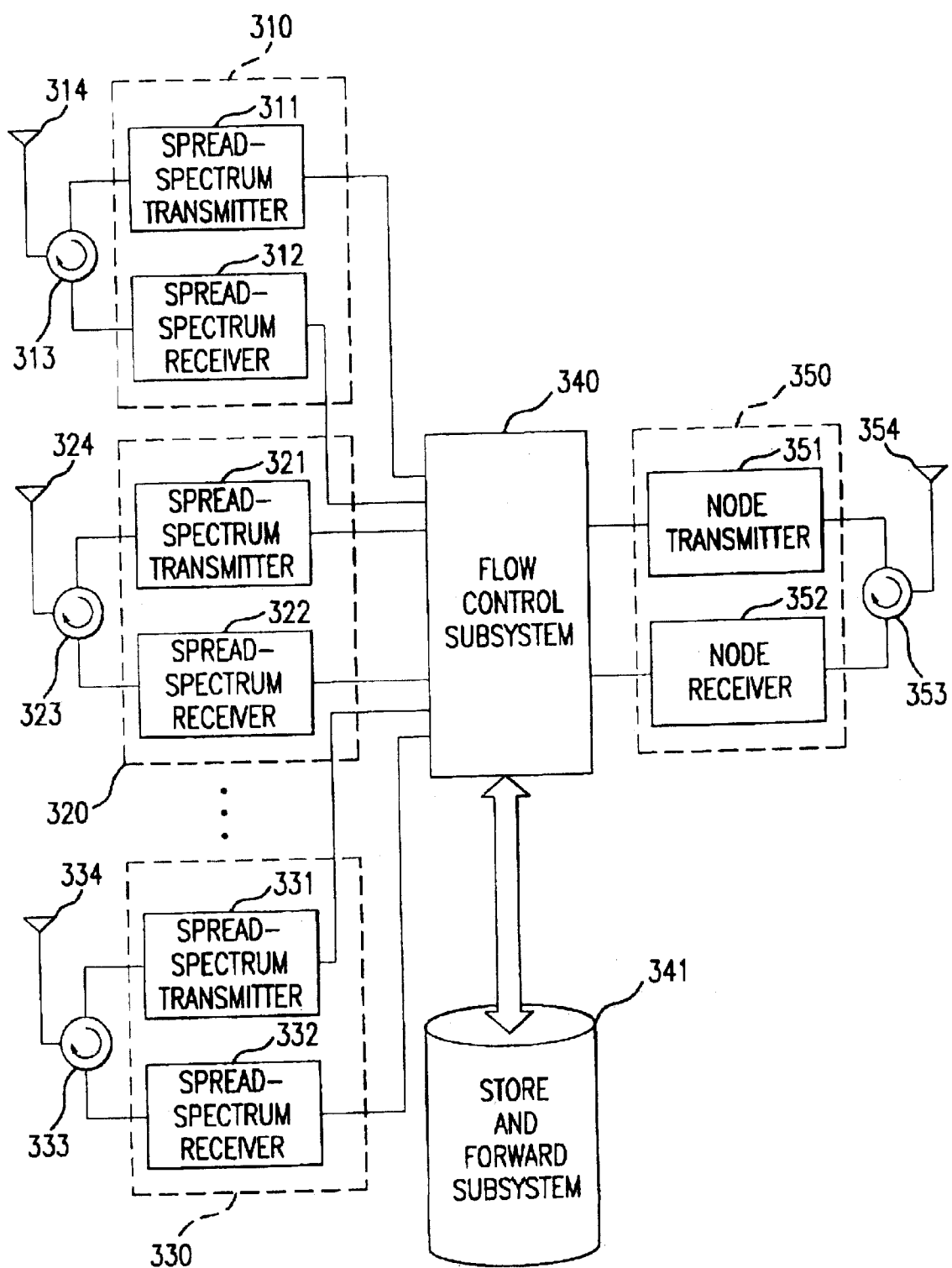
FIG. 4 is a block diagram illustrating key elements of a base station with a central office communicating with a set of a plurality of nodes.
Figure 5:
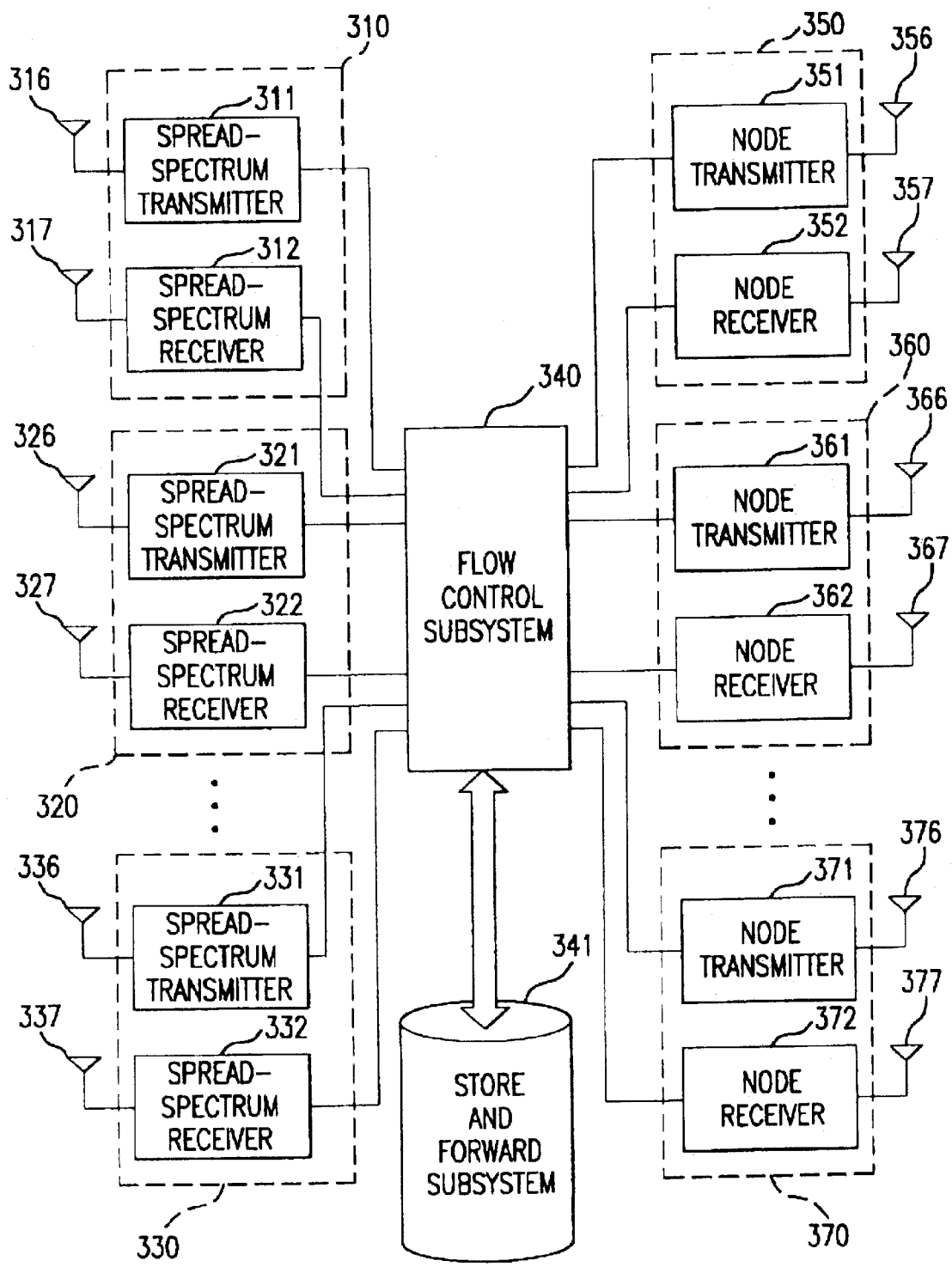
FIG. 5 is an alternative block diagram illustrating key elements of a base station.

FIGS. 4 and 5 illustratively show an example of what might be at each base station in the star network of FIG. 1, or at each base station of each node in the distributed network of FIGS. 2 and 3. For communicating between nodes, for example, in FIG. 4 shows node transceiver 350, or equivalently, a node transmitter 351 and a node receiver 352. The node transmitter 351 and the node receiver 352 are coupled through a node isolator 353 to a node antenna 354. Transceiver 350 can be at microwave frequencies or connect to a fiber optic link or any other channel capable of handling the traffic between nodes. In the case of the star network of FIG. 1, the node transceiver 350, or equivalently, a node transmitter 351 and a node receiver 352, would be located at a base station, and can operate at microwave frequencies or connected to a fiber optic link or any other channel capable of handling the communications to and from the central office 50.

FIG. 5 shows an example of a plurality of node transceivers 350, 360 and 370, or equivalently, a plurality of node transmitters 351, 361, 371 and a plurality of node receivers 352, 362, 372. In place of using a single antenna and an isolator, the first node transmitter 351 is coupled to a first node-transmitter antenna 356, and the first node receiver 352 is coupled to the first node-receiver antenna 357. Similarly, the second node transmitter 361 is coupled to a second node-transmitter antenna 366 and the second node receiver 362 is coupled to the second node-receiver antenna 367, and the third node transmitter 371 is coupled to the third node-transmitter antenna 376 and the third node receiver 372 is coupled to the third node-receiver antenna 377. The antennas could be omnidirectional, sectored, or steerable (smart) antennas.

With each node using the node transmitter 351 and the node receiver 352, of FIG. 4, or the plurality of node transmitters 351, 361, 371 and the plurality of node receivers, 352, 362, 372 of FIG. 5, a node communicates with a different node having a node transmitter and node receiver node receiver. Thus, in the plurality of nodes 110, 120, 130, 140, 150, 160, 170 180, 190, the first node 110 communicates with the second node 120, the fourth node 140 and the fifth node 150. The second node 120 communicates with the first node 110, the third node 130, the fourth node 140, the fifth node 150 and the sixth node 160. The third node communicates with the second node 120, the fifth node 150 and the sixth node 160. The fourth node communicates with the first node 110, the second node 120, the fifth node 150, the seventh node 170 and the eighth node 180. The fifth node communicates with the first node 110, the second node 120, the third node 130, the fourth node 140, the sixth node 160, the seventh node 170, the eighth node 180 and the ninth node 190. The sixth node 160 communicates with the second node 120, the third node 130, the fifth node 150, the eighth node 180 and the ninth node 190. The seventh node 170 communicates with the fourth node 140, the fifth node 150 and the eighth node 180. The eighth node 180 communicates with the fourth node 140, the fifth node 150, the sixth node 160, the seventh node 170 and the ninth node 190. The ninth node communicates with the fifth node 150, the sixth node 160 and the eighth node 180.

Each base station of FIG. 1, and each node of FIGS. 2 and 3, may include a plurality of spread-spectrum transceivers 310, 320, 330, or, equivalently, a plurality of spread-spectrum transmitters 311, 321, 331 and a plurality of spread-spectrum receivers 312, 322, 332, a store-and-forward subsystem 341, and a flow-control subsystem 340. The flow-control subsystem 340 typically would include a processor or computer. The store-and-forward subsystem 341 typically would include memory and the memory may be part of the computer embodying the processor for the flow-control subsystem 340. The store-and-forward subsystem 341 stores information, as bits, received from a CS-remote station and from a PS-remote station. The memory may be random access memory (RAM) or hard drive, or other volatile or non-volatile memory and memory storage device. Other devices are well-known in the art, and include hard drives, magnetic tapes, compact disk (CD), and other laser/optical memories and bubble memory devices. The particular flow-control subsystem 340 and the store-and-forward subsystem 341 would be specified by a particular system requirements and design criteria.

Each node in the plurality of nodes 110, 120, 130, 140, 150, 160, 170 180, 190 also includes at least one node transmitter 351, and more typically a plurality of node transmitters 351, 361, 371 and at least one node receiver 352 and more typically a plurality of node receivers 352, 362, 372. The store-and-forward subsystem 341 is coupled to and controlled by the flow-control subsystem 340. The plurality of spread-spectrum transmitters 311, 321, 331, are coupled between a plurality of spread-spectrum antennas 316, 326, 336 and the flow-control subsystem 340. The plurality of spread-spectrum receivers 312, 322, 332 are coupled between a plurality of receiver antennas 317, 327, 337 and the flow-control subsystem 340. FIGS. 2 and 3 show the first node 110 communicating with a first plurality of remote stations 11, 112, 113, 114. The second node 120 communicates with a second plurality of remote stations, with FIGS. 2 and 3 showing a first remote station 121 of the second plurality of remote stations. The third node 130 communicates with a third plurality of remote stations 131, 132 and the fourth node 140, the fifth node 150 and the sixth node 160 communicate with a fourth plurality of remote stations, a fifth plurality of remote stations, and a sixth plurality of remote stations, respectively. FIGS. 2 and 3 show the fourth node 140 communicating with a first remote station 141 of the fourth plurality of remote stations, the fifth node 150 communicating with a first remote station 151 of the fifth plurality of remote stations, and the sixth node 160 communicating with a first remote station 161 of the sixth plurality of remote stations. The seventh node 170 and the eighth node 180 are shown communicating with a seventh plurality of remote stations 171, 172, 173 and an eighth plurality of remote stations 181, 182, respectively. The ninth node 190 communicates with a ninth plurality of remote stations, and FIGS. 2 and 3 show the ninth node 190 communicating with a first remote station 191 of the ninth plurality of remote stations.

Figure 6:
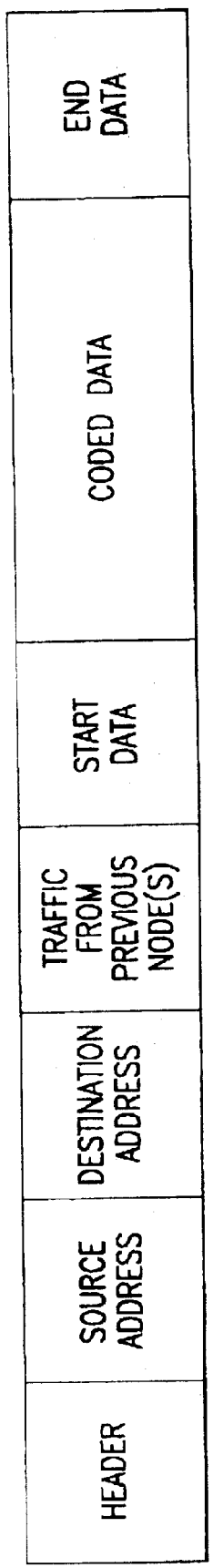
FIG. 6 shows a representative example of a packet.

Each node's spread-spectrum transceiver, or equivalently spread-spectrum transmitter and spread-spectrum receiver, communicates, using packets having spread-spectrum modulation, over radio waves, with the plurality of remote stations. Each packet has a source address and a destination address, and may have header, start of data, end of data, and other information such as flow-control information, forward error correction, and message data. FIG. 6 shows, by way of example, one way a packet may be structured.

The store-and-forward subsystem 341 in the star network of FIG. 1, stores and forward to the central office 50, one or more packets to and from the remote station. The flow-control subsystem 340 in the star network controls the store-and-forward subsystem 341, to store each packet arriving at the base station, and to forward the packet to the central office 50.

The store-and-forward subsystem 341 in the distributed network of FIGS. 2 and 3, stores and forwards, to another node or to the central office 50, one or more packets to and from the remote station. The store-and-forward subsystem 341, in the distributed network, for example, stores and forwards the one or more packets to and from another node in the plurality of nodes 110, 120, 130, 140, 150, 160, 170 180, 190.

The flow-control subsystem 340 in the distributed network controls the store-and-forward subsystem, to store each packet arriving at the base station. In a preferred embodiment, the flow-control subsystem 340 also is distributed throughout the network, with a flow-control subsystem 340 resident at each node. It is possible, of course, to have a central flow-control system. The flow-control subsystem 340 communicates traffic information between each of the nodes in the plurality of nodes. The traffic information typically includes traffic density at each of the nodes and memory availability. Using the traffic information and in response to a packet having the destination address to the hub node, the flow-control subsystem 340 routes the packet through appropriate nodes to the appropriate hub node. Based on the traffic at each node, and each packet having a destination address to either the hub or a remote station, the flow-control subsystem 340 transmits the packet from the hub node to an appropriate node, and routes the packet to the first recipient node. Each packet may traverse a different route en route to the remote station.

In response to the traffic congestion and to a plurality of packets having voice data, the flow-control subsystem routes the plurality of packets through a path in the plurality of nodes to ensure that the plurality of packets arrive sequentially. The flow control procedure balances the activity in each node relative to other nodes in the distributed network.

When an information packet arrives from a central office, the hub node routes the information packet to an appropriate second recipient node on the way to an intended remote station destination address.

Spread-Spectrum Sounding Channel

The base station is assumed to transmit to the plurality of remote stations at a first frequency $f_1$. A particular channel from the base station to a remote station is defined or determined by a particular chip-sequence signal, as is well known in the art for direct-sequence (DS) code-division-multiple access (CDMA) systems. The plurality of remote stations are assumed to transmit to the base station at a second carrier frequency $f_2$. A particular channel from a particular remote station to the base station is defined or determined by a particular chip-sequence signal, as is well known in CDMA systems.

The spread-spectrum sounding channel overcomes a major problem with a plurality of remote stations transmitting to a common base station. The plurality of remote stations may be located at different distances, and each remote station may have a different propagation path, to the base station. Thus, even if all the remote stations transmitted with the same power level, then the spread-spectrum signal from each remote station may arrive at the base station with a different power level. A strong power level from one remote station may cause sufficient interference to block or inhibit reception of the spread-spectrum signal from a more distant remote station. This power problem is commonly known as the "near-far" problem, or power control problem: How does the spread-spectrum system control the power transmitted from each remote station, so that the power received at the base station from each remote station is approximately the same? If the power received at the base station is the same for each remote station, then the capacity is limited by the number of remote stations transmitting to the base station. If, however, a particular remote station is sufficiently close to the base station, and its transmitter power can block reception of other remote stations, then capacity may be limited severely to only the remote station closest to the base station.

The spread-spectrum sounding channel overcomes the power control problem by permitting a remote station to have knowledge, a priori to transmitting, of a proper power level to initiate transmission. After the initial power level is used, closed-loop power control, which is well-known in the art, can be employed.

An additional or alternative benefit from the spread-spectrum sounding channel is more accurate frequency control at a remote station. The carrier frequency transmitted from a remote station may be shifted at the base station due to Doppler shift in carrier frequency caused by motion. This spread-spectrum sounding channel corrects or compensates for Doppler shift in carrier frequency caused by the effective motion of the remote station. The remote station could be at a fixed location, and the Doppler shift in carrier frequency could be caused by time changes in the propagation path, such as trees blowing in the wind. After initial communications, a Costas loop or other frequency controlling circuit may be employed to control or compensate for frequency changes. Such devices or circuits are well-known in the art.

The spread-spectrum sounding channel broadly provides an improvement to a spread-spectrum system which has a base station (BS) and a plurality of remote stations (RS). The base station has a BS-spread-spectrum transmitter and a BS-spread-spectrum receiver. The BS-spread-spectrum transmitter transmits, using radio waves, a plurality of BS-spread-spectrum signals at a first frequency $f_1$. The BS-spread-spectrum receiver receives, at a second frequency $f_2$, as radio waves, a plurality of RS-spread-spectrum signals from the plurality of remote stations. The plurality of BS-spread-spectrum signals at the first frequency $f_1$ are outside the correlation bandwidth of the plurality of RS-spread-spectrum signals at the second frequency $f_2$. Each of the plurality of remote stations has an RS-spread-spectrum transmitter for transmitting, as a radio wave, an RS-spread-spectrum signal at the second frequency $f_2$.

At the base station, the improvement for the sounding channel includes BS-transmitter means, and interference-reduction means. The BS-transmitter means transmits, as a radio wave, a BS-channel-sounding signal at the second frequency $f_2$. The BS-channel-sounding signal has a bandwidth which is no more than twenty percent of the spread-spectrum bandwidth of the plurality of RS-spread-spectrum signals, and preferably not more than one percent of the spread-spectrum bandwidth.

The interference-reduction means is located at a front end to the BS-spread-spectrum receiver. The interference-reduction means reduces, by cancelling and notch filtering, at the second frequency, the BS-channel-sounding signal from the plurality of RS-spread-spectrum signals arriving at the base station.

While the BS-channel-sounding signal should have a bandwidth of no more than one percent of the spread-spectrum bandwidth of the RS-spread-spectrum signal, system performance improves significantly as the bandwidth of the BS-channel-sounding signal decreases. Preferably, the BS-channel-sounding signal has a bandwidth of no more than one percent, and should not exceed twenty percent, of the spread-spectrum bandwidth of the RS-spread-spectrum signal. The BS-channel-sounding signal may be a continuous wave signal, also known as a carrier signal. Alternatively, the BS-channel-sounding signal may be modulated with amplitude modulation (AM), frequency modulation (FM), phase modulation (PM), or a combination thereof. Amplitude-shift-keying (ASK) modulation, frequency-shift-keying (FSK) modulation or phase-shift-keying (PSK) modulation may be employed. Similarly, a narrowband spread-spectrum signal could modulate the BS-channel-sounding signal. A combination of these modulations also could be employed. The modulation in the BS-channel-sounding signal can be used for base station identification, as well as for other information such as commercials, stock quotes, etc.

The bandwidth of the BS-channel-sounding signal is a determinative factor, and a design choice, since increased bandwidth will cause increased interference to the plurality of RS-spread-spectrum signals, which are at the same frequency as the BS-channel-sounding signal. At a one percent bandwidth of the plurality of RS-spread-spectrum signals, little degradation in system performance results.

Each of the plurality of remote stations includes RS-receiver means, RS-power means and compensating means. The RS-receiving means receives the BS-channel-sounding signal at the second frequency, and demodulates the BS-channel-sounding signal, and outputs an RS-receiver signal. RS-power-level means, in response to the received power level of the BS-channel-sounding signal, adjusts an initial RS-power level of the RS-spread-spectrum transmitter located at the remote station. In response to the RS-receiver signal, the compensating means compensates the second frequency, for Doppler shift, of the RS-spread-spectrum signal of the RS-spread-spectrum transmitter located at the remote station. For example, if the carrier frequency of the received BS-channel-sounding signal had a negative Doppler shift from its carrier frequency, as received at the remote station, then the compensating means would impose a positive shift from the designated carrier frequency on the transmitted RS-spread-spectrum signal. Due to motion of the remote station or propagation path motions in the communications channel, the RS-spread-spectrum signal arrives at the base station at the corrected carrier frequency, i.e., at the second frequency $f_2$. In a preferred embodiment, the RS-power means is employed to initially set the transmitter power of the remote station. The compensating means may also be used to correct the transmitter frequency of the RS-spread-spectrum transmitter.

Figure 7:
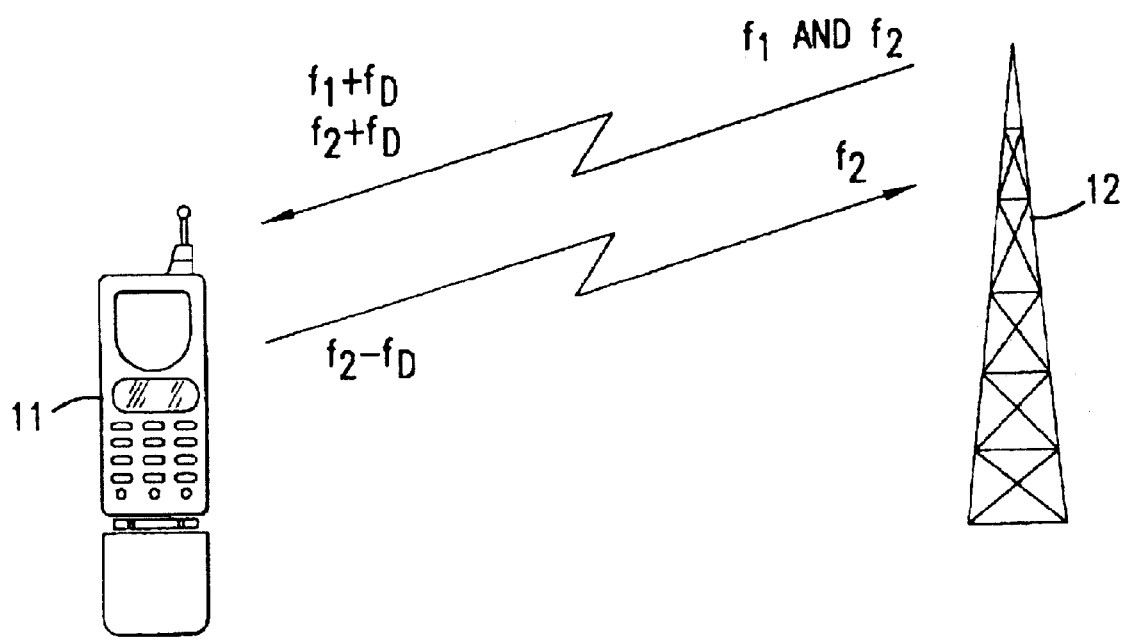
FIG. 7 illustrates a remote station communicating with a base station, with channel sounding.

In the exemplary arrangement shown in FIG. 7, the base station 12 is shown communicating, using radio waves, with a remote station with frequency compensation. Since the BS-channel-sounding signal is transmitted, as a radio wave, from the base station 12 at the second frequency $f_2$ to the remote station 11, and the remote station 11 knows at what frequency the BS-channel-sounding signal is suppose to be received, then remote station 11 can determine the Doppler frequency shift $f_D$ and compensate its transmitter frequency by a similar amount so that the RS-spread-spectrum signal arrives at the base station 12 with a carrier frequency at the correct second frequency $f_2$. Thus, the RS-spread-spectrum signal is detected at the base station at the second frequency $f_2$, without a Doppler shift in carrier frequency $f_D$. If motion of the remote station caused a positive shift in the Doppler frequency $f_D$, then the correct compensation would be to subtract the Doppler shift in carrier frequency $f_D$ and transmit at frequency $f_2 - f_D$. The remote station 11 also can measure the power level of the BS-channel-sounding signal, and from this measurement, set its initial power level for transmitting the RS-spread-spectrum signal at the second frequency $f_2$.

Figure 8:
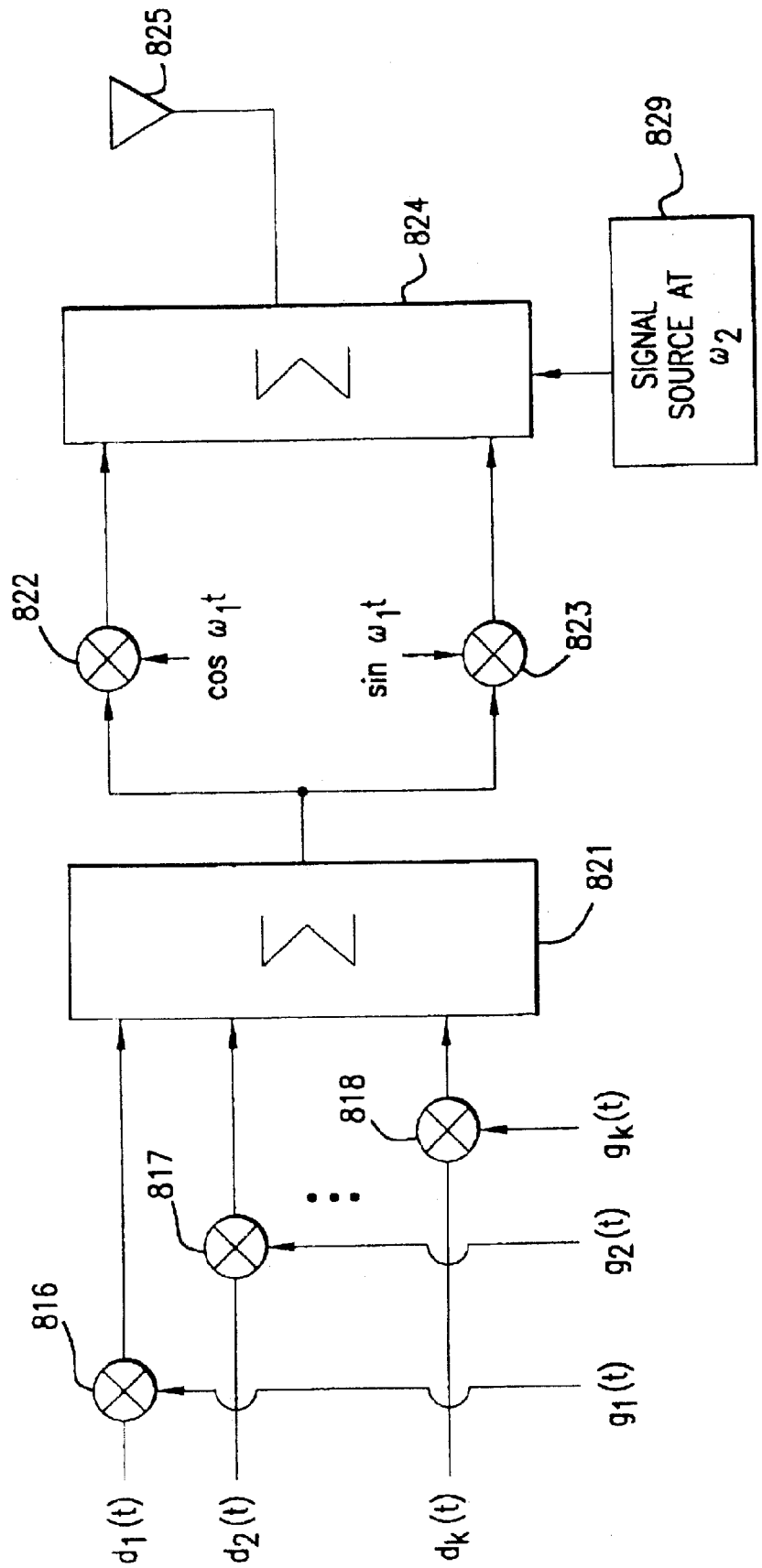
FIG. 8 is a block diagram illustrating a base station signal with channel sounding added to a base station spread-spectrum transmitter.

In FIG. 8, the improvement to the BS-spread-spectrum transmitter is shown. The signal source 829 generates the BS-channel-sounding signal. The BS-channel-sounding signal is combined in combiner 824 with the BS-spread-spectrum signal. The BS-spread-spectrum signal may be generated, as is well known in the art, by a plurality of product devices 816, 817, 818, which multiply a plurality of data signals $d_1(t), d_2(t), \ldots d_K(t)$, by a plurality of chip-sequence signals $g_1(t), g_2(t), \ldots g_K(t)$. The outputs from the plurality of product devices 816, 817, 818 is a plurality of spread-data signals. Typically, the plurality of spread-data signals is combined linearly by a combiner 821, to generate a combined-spread-data signal. The combined-spread-data signal is multiplied by in-phase product device 822 by a cosine signal at the first frequency $f_1$, and by a quadrature-phase product device 823 by a sine signal at the first frequency $f_1$, to generate in-phase and quadrature-phase components of the BS-spread-spectrum signal. The in-phase component of the BS-spread-spectrum signal and the quadrature-phase component of the BS-spread-spectrum signal are then combined to make the BS-spread-spectrum signal which is transmitted from the base station 12 at the first frequency $f_1$, by antenna 825. Techniques for generating spread-spectrum signals are well known in the art, and the technique shown in FIG. 8 is only representative.

The design of spread-spectrum transmitters is well-known in the art. Typically, the BS-spread-spectrum transmitter would be implemented in a digital signature processor (DSP) or application specific integrated circuit (ASIC). Alternative techniques for building a spread-spectrum transmitter include using a surface-acoustic-wave (SAW) device, with the SAW device having an impulse response matched to the specific chip-sequence signal desired for a spread-spectrum channel. Further, the plurality of chip-sequence signals can be stored in a memory, and each time a particular digital signal is applied to a memory address, and particular chip-sequence signal is outputted to the combiner 821. All these techniques, and others, are well known in the art for generating spread-spectrum signals.

The signal source 829 generates the BS-channel-sounding signal, which may be a simple continuous wave signal, or a signal modulated with AM modulation, FM modulation, PM modulation, ASK modulation, FSK modulation, PSK modulation or spread-spectrum modulation. With modulation, the BS-channel-sounding signal can carry data, such as signaling data or order wire data. Alternatively, the BS-channel-sounding signal can broadcast to the plurality of remote stations general information such as timing, advertisements or commercials, and other information to update the remote station from the base station.

Figure 9:
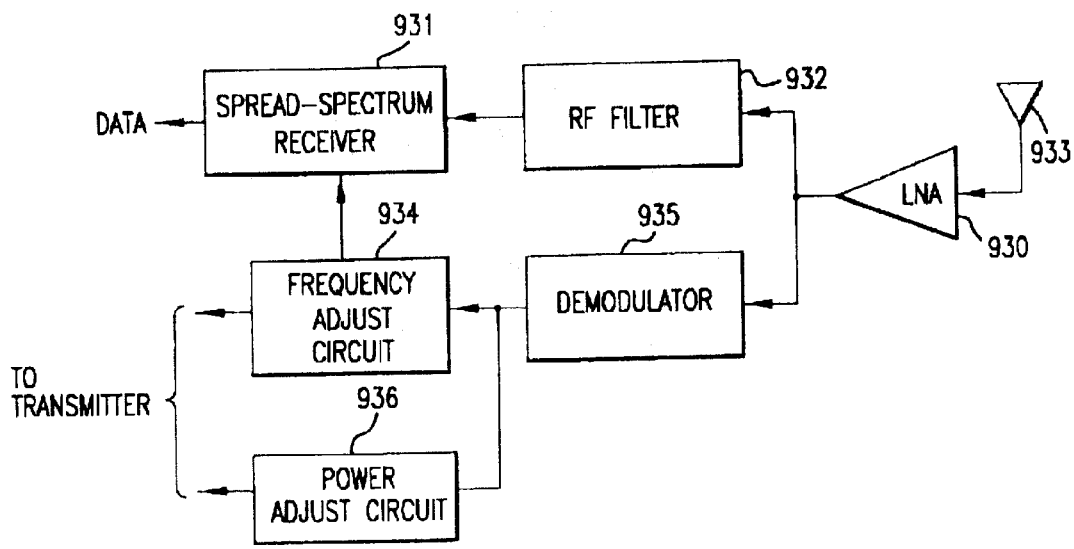
FIG. 9 is a block diagram illustrating the improvement to the remote station spread-spectrum receiver for the BS-channel-sounding signal.

FIG. 9 illustratively shows the improvement to the remote station receiver. The RS-spread-spectrum receiver includes the spread-spectrum receiver 931, the RF filter 932, and the low noise amplifier (LNA) 930, coupled to the antenna 933. The RF filter 932 is coupled between the spread-spectrum receiver 921 and the low noise amplifier 930. The components for the RS-spread-spectrum receiver are well known in the art. For example, the RS-spread-spectrum receiver may be embodied as a plurality of product devices and a chip-signal generator, with output lowpass or bandpass filters. The operation of multiplying a received spread-spectrum signal by a plurality of chip-sequence signals is well known, and can be found in many textbooks on the subject. Alternatively, the RS-spread-spectrum receiver may be embodied as a plurality of matched filters, which have a plurality of impulse responses matched to the plurality of chip-sequence signals embedded in the received BS-spread-spectrum signal. The RS-spread-spectrum receiver may be implemented as an integrated circuit, ASIC, SAW device, and may operate at baseband, intermediate frequency or other processing frequency.

The sounding channel improvement includes RS-receiver means, which is embodied as demodulator 935. The demodulator 935 is coupled to low noise amplifier 930, for receiving the BS-channel-sounding signal at the second frequency $f_2$, or at the second frequency $f_2$ plus or minus a Doppler shift $f_d$ in carrier frequency from the second frequency $f_2$. The demodulator 935 may include a tracking filter, phase-locked-loop (PLL) circuit, FM or PM discriminator, spread-spectrum receiver, or other circuitry for demodulating the BS-channel-sounding signal. The demodulator 35 demodulates the BS-channel-sounding signal, and outputs an RS-receiver signal. The RS-receiver signal is a demodulated version of the received BS-channel-sounding signal, and may include a power level proportional to a received power level of the BS-channel-sounding signal, and a frequency representation or shift, of the received BS-channel-sounding signal.

The compensating means is embodied as a frequency-adjust circuit 934, coupled to the RS demodulator 935. In response to the RS-receiver signal, the frequency-adjust circuit 934 compensates to the first frequency $f_1$ the RS-spread-spectrum signal of the RS-spread-spectrum transmitter located at the remote station. The frequency-adjust circuit 934 also can provide Doppler information, including Doppler shift in carrier frequency $f_D$, by way of a Doppler signal to the spread-spectrum receiver 931. The frequency-adjust circuit 934 might include a local oscillator or other signal source, and a comparator circuit. The local oscillator or signal source from the RS-spread-spectrum transmitter generates a local signal at the second frequency $f_2$. The comparator compares the local signal with the received BS-channel-sounding signal, or the RS-receiver signal, to determine Doppler shift in carrier frequency $f_D$. A signal with the Doppler shift in carrier frequency can be used to adjust the transmitter frequency of the RS-spread-spectrum signal. Electronic circuits for the comparator and frequency-adjust circuit 934, are well known in the art. The spread-spectrum receiver can adjust its oscillator circuit, or the frequency-adjust circuit 934 can adjust the frequency of the oscillator for the spread-spectrum receiver 931, thereby compensating for Doppler shift in carrier frequency $f_D$ due to motion.

Figure 10:
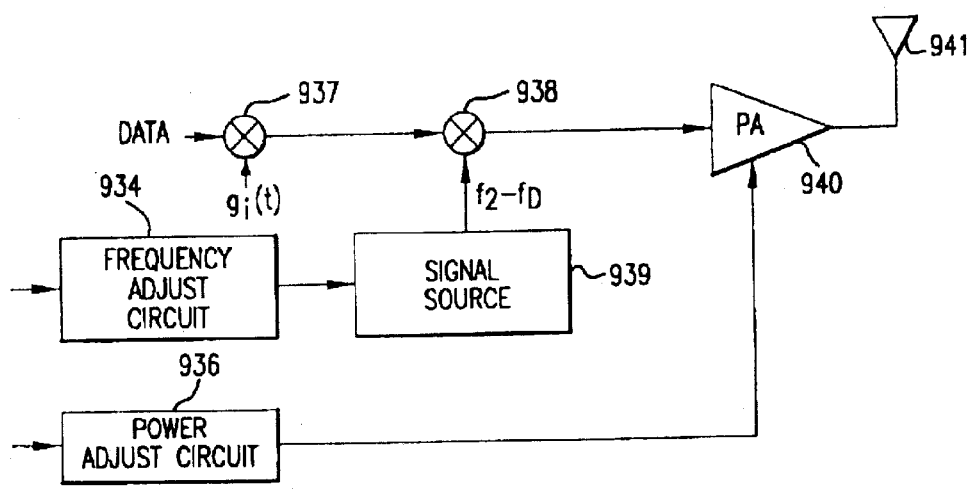
FIG. 10 is a block diagram illustrating the improvement to the remote station spread-spectrum transmitter.

The RS-power means may be embodied as a power-adjust circuit 936, which is coupled to the output of the demodulator 935. As shown in FIG. 10, the power-adjust circuit 936 couples to a variable power amplifier 940 of the RS-spread-spectrum transmitter. Depending on the power level from the BS-channel-sounding signal, or RS-receiver signal, the power-adjust circuit 936 can adjust the output power of the variable power amplifier 940 to a desired level. An equivalent circuit for the variable power amplifier 940 would be a variable attenuator, which attenuates in response to a power-adjust signal.

Similarly, the frequency-adjust circuit 934 may couple to the signal source 939 of the RS-spread-spectrum transmitter. The frequency-adjust circuit 934 can offset the transmitter frequency by the Doppler frequency $f_D$, so that the RS-spread-spectrum signal arrives at the base station 12 at the correct second frequency $f_2$. By subtracting the Doppler frequency $f_D$ from the second frequency $f_2$, the transmitter frequency of the RS-spread-spectrum signal shifts back to the second frequency $f_2$ due to the Doppler frequency $f_D$ added to the carrier frequency of the RS-spread-spectrum signal, due to motion of the remote station.

In FIG. 10, the RS-spread-spectrum transmitter includes a product device 937 for multiplying a chip-sequence signal by data to generate a spread-data signal. For a positive Doppler shift in carrier frequency of the BS-channel-sounding signal, the spread-data signal is shifted to a carrier frequency of $f_2-f_D$, by product device 938, to generate the RS-spread-spectrum signal. For a negative Doppler shift in carrier frequency of the BS-channel-sounding signal, the spread-data signal is shifted to a carrier frequency of $f_2+f_D$, by product device 938, to generate the RS-spread-spectrum signal. The RS-spread-spectrum signal is amplified by amplifier 940 and radiated by antenna 941.

Figure 11:
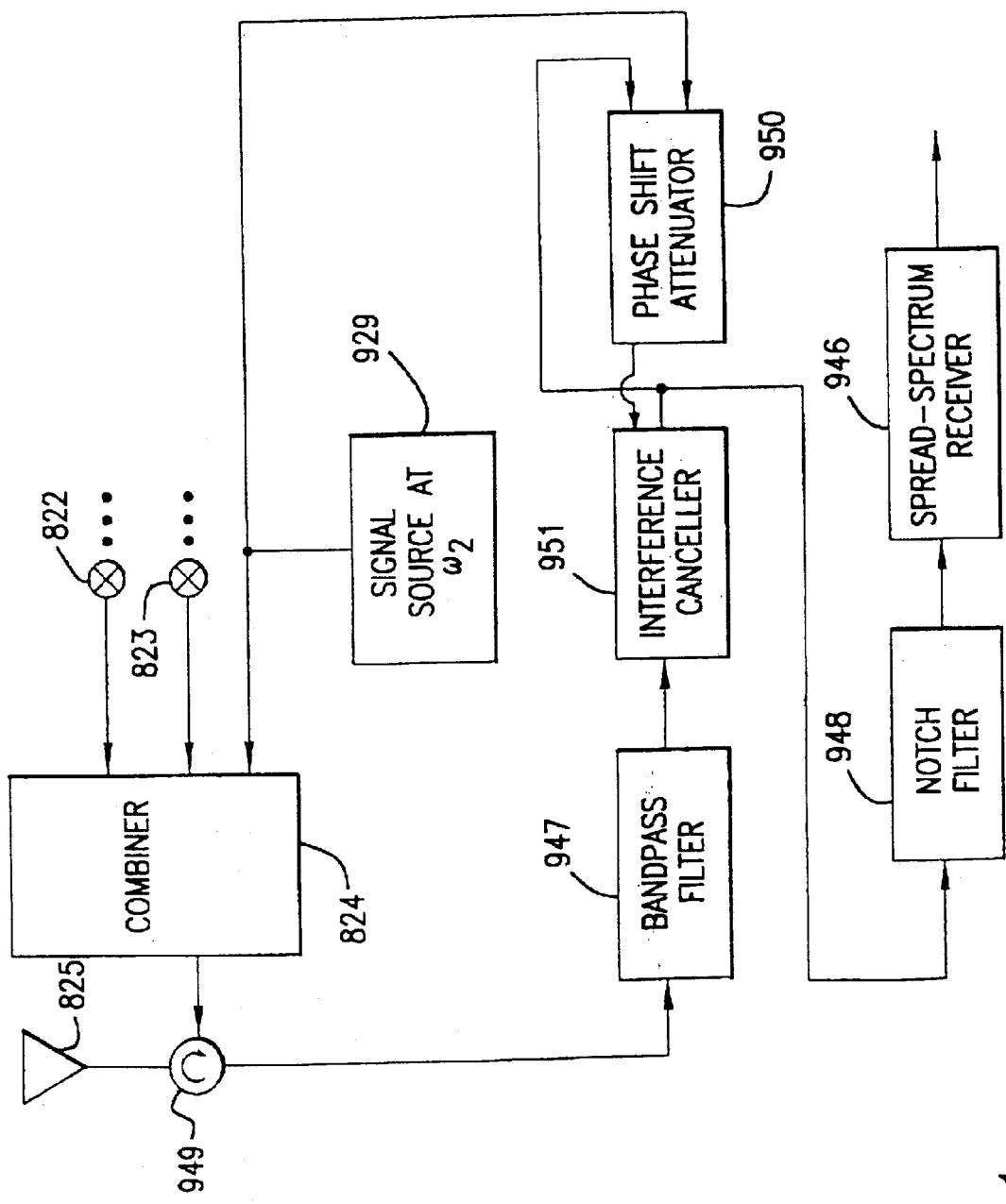
FIG. 11 is a block diagram showing an interference-reduction subsystem at a front end to a base station spread-spectrum receiver.

FIG. 11 shows the improvement to the BS receiver. The BS transmitter 824 is connected to a coupler 949, such as a circulator, which connects to the antenna 825. The antenna 825 is used in FIG. 11 for transmitting and receiving at the second frequency $f_2$. The RS-spread-spectrum signals received from the remote stations pass through the coupler 949, through the bandpass filter 947 and in to the interference canceller 951. The BS-channel-sounding signal from the signal source 829 passes in to the phase-shift attenuator 950. An output of the interference canceller 951 is coupled to an input of the phase-shift attenuator 950. The signal from the interference canceller 51 adjusts the phase-shift attenuator 950 so as to minimize the BS-channel-sounding signal level fed in to the base station spread-spectrum receiver 946.

As an option, a notch filter 948 may be coupled between the interference canceller 951 and the base station spread-spectrum receiver 946. The notch filter 948 notch filters the interference from the BS-channel-sounding signal. An interference canceller 951 with a phase-shift attenuator 950 for reducing interference, in general, is well known in the art.

The interference canceller 951 and the phase-shift attenuator 950 operate in a feedback loop so as to minimize the effect of a received signal at the second frequency $f_2$ by effectively feeding a signal from signal source at the second frequency $f_2$, 180° out of phase with the received signal.

Figure 12:
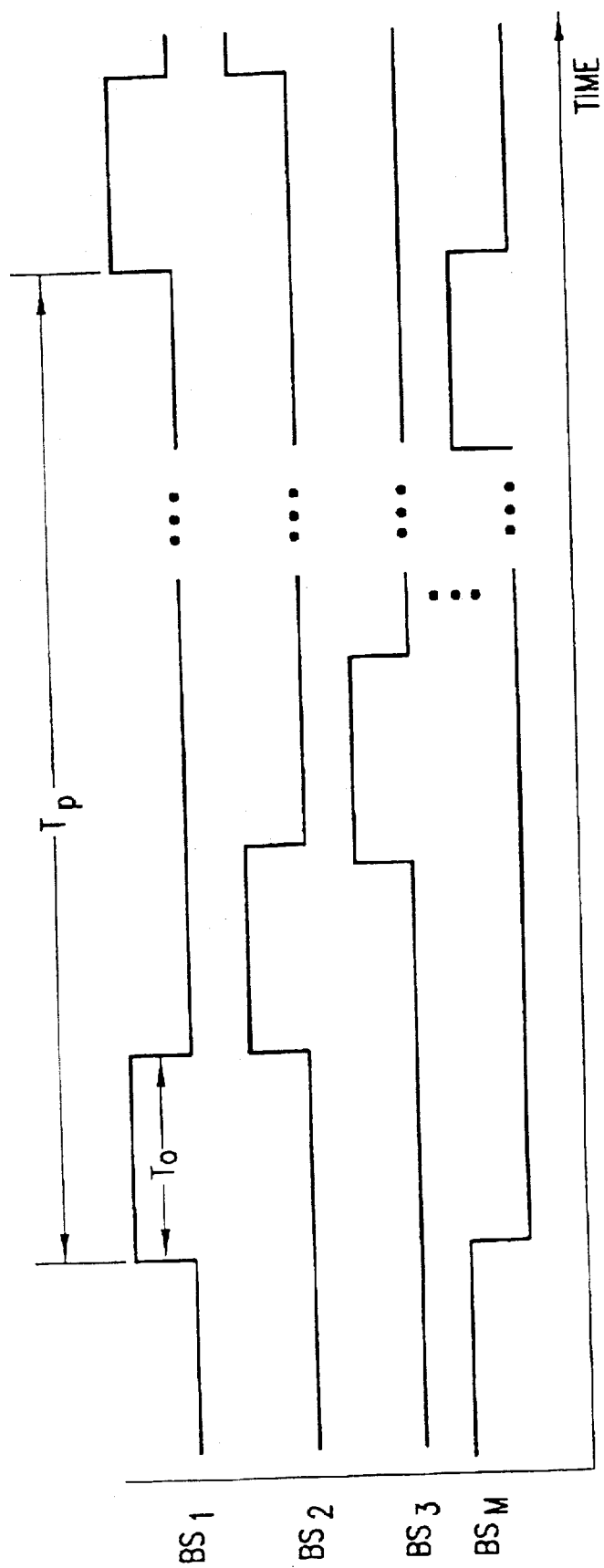
FIG. 12 is a timing diagram of how several base stations might transmit the BS-channel-sounding signal.

The present invention may be used in a cellular architecture having a plurality of base stations. The BS-channel-sounding signal may be modulated to identify a particular base station. Thus, a remote station knows with which cell it is in communication by the modulation on the BS-channel-sounding signal. An alternative may have a plurality of base stations, which cover a large geographic area, transmit their respective BS-channel-sounding signal in a respective time slot, as shown in FIG. 12. During a particular time slot, a packet may be transmitted by the respective base station. The packet may include no information, or identifying information. From the packet, a remote station can determine relative power, and Doppler shift in carrier frequency $f_D$, of the particular base station to the remote unit.

The present invention also includes a method for improving a spread-spectrum system. The spread-spectrum system has at least one base station and a plurality of remote stations (RS). The base station (BS) has a BS-spread-spectrum transmitter for transmitting, as radio waves, a plurality of BS-spread-spectrum signals at a first frequency $f_1$. The base station also has a BS-spread-spectrum receiver for receiving, at a second frequency $f_2$, a plurality of RS-spread-spectrum signals from the plurality of remote stations. The plurality of BS-spread-spectrum signals are assumed to be at the first frequency $f_1$ outside a correlation bandwidth of the plurality of RS-spread-spectrum signals at the second frequency $f_2$. Each of the plurality of remote stations has an RS-spread-spectrum transmitter for transmitting an RS-spread-spectrum signal at the second frequency $f_2$. The method comprises the steps of transmitting, from a BS transmitter, located at the base station, a BS-channel-sounding signal at the second frequency $f_2$. The BS-channel-sounding signal has a bandwidth no more than twenty percent of the spread-spectrum bandwidth of the plurality of RS-spread-spectrum signals, and preferably less than one percent of the spread-spectrum bandwidth of the plurality of RS-spread-spectrum signals. The method includes receiving, at each of the plurality of remote stations with an RS receiver, the BS-channel-sounding signal at the second frequency $f_2$, and receiving, at each of the plurality of remote stations with an RS demodulator, a the BS-channel-sounding signal. The RS demodulator outputs an RS-receiver signal. The method further includes the step of compensating, in response to the RS-receiver signal, a frequency-adjust circuit to the first frequency $f_1$ the RS-spread-spectrum signal of the RS-spread-spectrum transmitter located at the remote station. The method may adjust, in response to the RS-receiver signal, an initial RS-power level of the RS-spread-spectrum transmitter located at the remote station. At the base station, the method includes the step of reducing, at the second frequency $f_2$, the BS-channel-sounding signal from the RS-spread-spectrum signal arriving at the base station.

The method optionally may further include the step of compensating, in response to RS-receiver signal, to the first frequency $f_1$ the RS-spread-spectrum signal of the RS-spread-spectrum transmitter located at the remote station.

Sharing of Capacity Between CS and PS Remote Stations

The current third generation (3G) system operates in a star network, as illustratively shown in FIG. 1, with CS-remote stations, but with one dedicated channel for packet-switched mode available for PS-remote stations. The dedicated channel for PS-remote stations uses a PS-chip-sequence signal for spread-spectrum processing data from the PS-remote station. For one dedicated channel, the PS-chip-sequence signal is used by all of the PS-remote stations. Only one PS-remote station, however, accesses the base station at a time.

More than one channel can be allocated for PS-remote stations. For example, two or more dedicated channels may be allocated for PS-remote stations. For two dedicated channels for packet-switched signals, the system would have two different chip-sequence signals, one each allocated to each of the dedicated packet-switched channels.

The plurality of CS-remote stations and the plurality of PS-remote stations all operate at the same frequency, and within the same bandwidth, and preferably with the same chip rate $f_c$. A particular communications channel for a particular CS-remote station or a PS-remote station is set by a particular chip-sequence signal assigned for the respective CS-remote station or PS-remote station. Communications channels defined by chip-sequence signals is well-known in the art.

In the plurality of CS-remote stations, the various CS-remote stations, while operating at the same chip rate $f_c$, can operate at different data rates. Typically, when a CS-remote station initiates communications with a particular base station, the CS-remote station requests a communications channel with a data rate and error rate. The CS-remote station receives the chip-sequence signal appropriate to the allocated data rate, from the base station. This allocation is made to avoid exceeding system capacity.

After establishing a communications channel, a CS-remote station maintains communications with that particular base station until finished, or until the CS-remote station makes handoff with another base station. In the plurality of CS-remote stations, the various CS-remote stations communicating with a base station may operate at different data rates and error rates, and transmit with different power levels. Data received from the CS-remote station communicating with the base station, are stored in the store-and-forward subsystem 341 of FIGS. 4 and 5, and then forwarded to the central office 50 in a star network of FIG. 1, or forwarded to a neighboring nodes and to central office 50 for the distributed network of FIGS. 2 and 3.

For packet-switched communications, with only one dedicated communications channel for packet-switched signals, only one PS-remote station communicates with a base station, at a time. Each PS-remote station uses the same PS-chip-sequence signal. Several strategies exist in the literature, if several PS-remote stations desired to communicate with the base station. One strategy requires a polling of each PS-remote station that has indicated, by a separate short transmission, its desire to transmit a packet. Such a system works well when a large number of PS-remote stations want to transmit simultaneously. Alternatively, a base station transmits a busy signal when no or insufficient capacity exists. When capacity exists, the base station transmits or assigns the chip-sequence signal and data rate to all PS-remote stations. A PS-remote station reads the message from the base station, and transmits using the chip-sequence signal and data rate assigned from the base station. This latter operation is similar to ALOHA system and the Ethernet system.

The PS-remote station functions essentially in a store-and-forward operation, since a particular PS-remote station stores a packet, and only forwards the packet to the base station when permitted to do so.

The base station also functions in a store-and-forward operation. Data received from the PS-remote station communicating with the base station, are stored in the store-and-forward subsystem 341 of FIGS. 4 and 5, and then forwarded to the central office 50 in a star network of FIG. 1, or forwarded to a neighboring nodes and to central office 50 for the distributed network of FIGS. 2 and 3.

A PS-remote station transmits the packet quickly, and then ceases transmitting.

The star network typically has more users for a base station than in a distributed network, as shown in FIG. 2, because the base stations in the star network are far apart, while in the distributed network, there are many base stations close together.

In a typical operation of either a star network or distributed network, multiple CS-remote stations communicate with the base station, by transmitting and receiving information to and from the base station. The multiple CS-remote stations want to communicate with a base station continuously, and each CS-remote station maintains a channel connection, until a "hang-up" occurs. On the other hand, a PS-remote station wants to send a packet of data to the base station, and then immediately break communications. The circuit-switched system CS-remote stations operate at the same time, each using some of the total capacity in the spread-spectrum channels of the base station. Packet-switched system users operate one-at-a time, and only use the capacity which is still available in the spread-spectrum channels from the base station, since the circuit-switched remote stations may not always use all of the capacity available in the spread-spectrum channels from the base station.

With many CS-remote stations communicating with a base station, a problem can arise such that a PS-remote station cannot communicate with the base station. The available capacity in the spread-spectrum channels at a base station changes dynamically with time, since CS-remote stations can stop communicating with the base station, and new CS-remote stations can initiate communications with a base station. When a first CS-remote station stops communicating with a base station, another, labeled second CS-remote station, can take the available spread-spectrum channel relinquished by the first CS-remote station, and available capacity in the spread-spectrum channels at the base station, made available by the first CS-remote station. Alternatively, a PS-remote station can take the space, or available capacity, in the spread-spectrum channels with the base station, which became available with the first CS-remote station ceasing communications with the base station. The PS-remote station, however, only requires the packet-switched channel in which to send and receive data to and from the base station, for a short time.

If a PS-remote station wants access to a base station, and to communicate with a base station, then the PS-remote station is told, by the flow-control subsystem 340 of the base station: (1) packet-switched channel availability, (2) available capacity in the spread-spectrum channels at the bass station, (3) data rate available for data transmission, (4) and chip-sequence signal to be used by the PS-remote station for the particular available channel. Additionally, the PS-remote station needs to know at which power level to transmit to the base station, to avoid ramping up through a series of power levels until an acceptable power level is reached, and to avoid jamming or causing interference to the CS-remote stations. Normally, only one PS-remote station communicates at a time with a base station, while multiple CS-remote stations simultaneously communicate with the base station.

If there are too many PS-remote stations communicating with the base station, then a PS-remote station requesting the packet-switched channel is told either a packet-switched channel is available, or to wait until the packet-switched channel becomes available.

Figure 13:
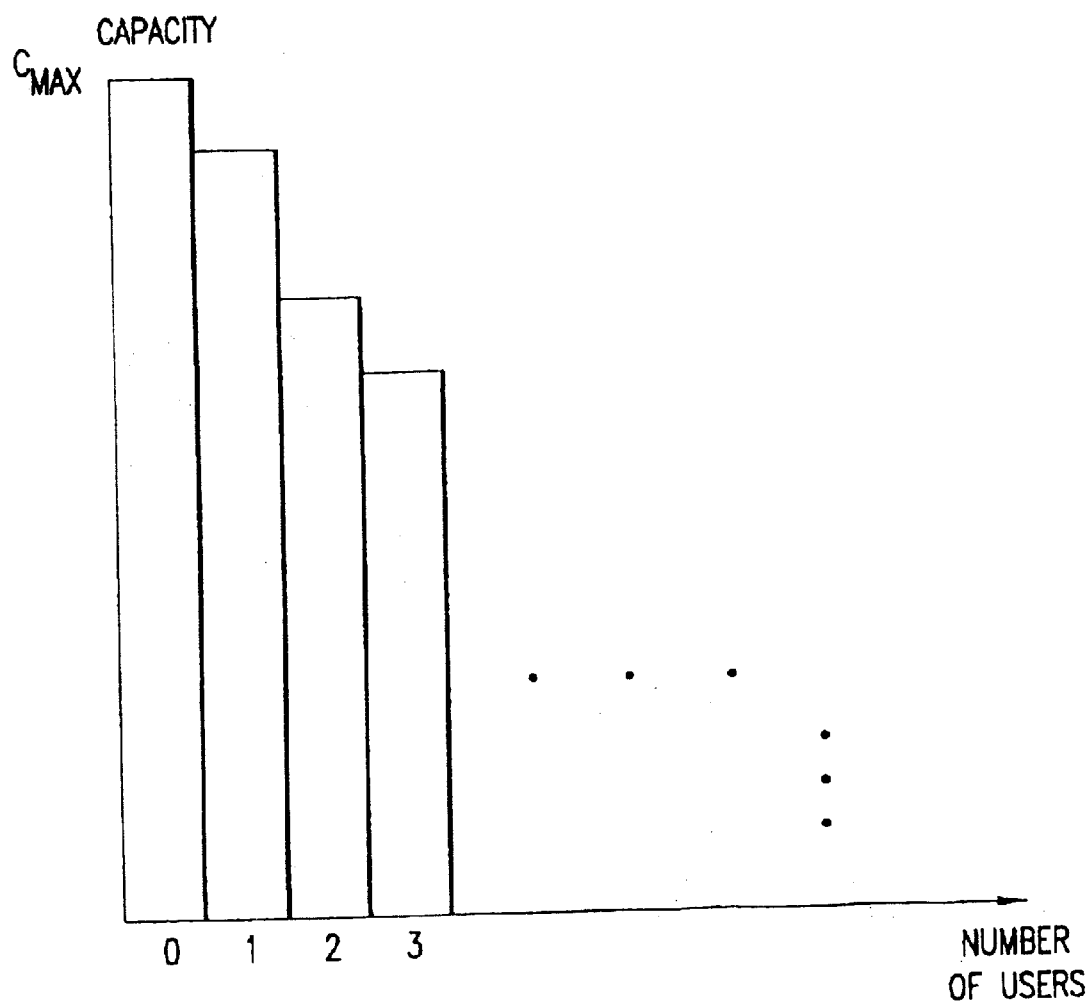
FIG. 13 depicts available capacity at a base station, versus number of users.

Available capacity at the base station is the ability of the base station to receive and transmit, in the spread-spectrum channels assigned to the base station, store, all incoming CS-packet signals form CS-remote stations, and PS-packet signals from PS-remote stations. Referring to FIG. 13, a chart illustrates available capacity versus number of users. The maximum capacity $C_{MAX}$ is the maximum amount of information, or the total data rate, bits per second (bps), packets, that the spread-spectrum channels of the base station can handle. Typically, the capacity would be for uplink communications paths, from CS-remote stations and PS-remote stations to the base station. The amount of information from a CS-remote station can vary, based on data rate. Maximum capacity is available with no users. As the number of users increases, the available capacity decreases. If several CS-remote stations simultaneously send at high data rates, then the total number of users who can access the bases stations decreases.

The data rate from a PS-remote station also factors into whether a base station can accept a PS-remote station. If the CS-remote stations already are using the capacity in the spread-spectrum channels of the base station, then there may be no data rate which can be assigned to a PS-remote station.

A problem with using either the star network or the distributed network, is that, if a CS-remote station, or multiple CS-remote stations, required high capacity in the spread-spectrum channels, while communicating with a base station, then that particular CS-remote station, or multiple CS-remote stations, may require all the capacity in the spread-spectrum channels of the base station. Under these conditions, a PS-remote station would not be able to communicate with the base station.

Capacity of a base station is the ability of the base station to receive a spread-spectrum CDMA signals, in the spread-spectrum channels. The capacity is limited by bandwidth.

If a base station had all of its available capacity taken for a given time period, then the flow-control subsystem 340 in that base station sends effectively a busy signal to other subscribers, indicating the there is no available capacity. As soon as a CS-remote station finished transmitting to the base station, then the flow-control subsystem 340 of the base station can send a signal indicating how much capacity in the store-and-forward subsystem 341 is available. At this time, another CS-remote station or PS-remote station can access the base station. Thus, if all the capacity in the spread-spectrum channels at a base station is used, then a CS-remote station must stop transmitting to the base station, before a new CS-remote station can access the base station.

Assume that a store-and-forward subsystem 341 at a base station has ten kilobit capacity available, with the rest of the spread-spectrum channel capacity being used by CS-remote stations. If a first PS-remote station requiring ten kilobits now accessed the base station, then a second PS-remote station cannot access the base station until the first PS-remote station finishes transmission, and capacity in the spread-spectrum becomes available. Of course, the first PS-remote station and the second PS-remote station may attempt to access the base station at the same time, with a collision resulting. Most likely, one of the first PS-remote station and the second PS-remote station would access the base station. The successful remote station accessing the base station would receive an acknowledgment signal, thereby knowing the communications of the packet is complete. The unsuccessful PS-remote station would attempt at a later time, to access the base station, and would continue to attempt to send the PS-packet to the base station, until receipt of an acknowledgment signal. As an alternative embodiment, the base station could assign a time slot for each PS-remote station wanting to send a PS-packet to the base station. But the overhead in setting up the time slot is believed to reduce overall communications data rate to the base station.

If a first PS-remote station accessed the base station and only requires two kilobits capacity in the spread-spectrum channels, then in the spread-spectrum channels of the base station has eight kilobits capacity available. The second PS-remote station can access the base station, if the second PS-remote station only required eight kilobits capacity in spread-spectrum channels. A second chip-sequence signal is needed for the second PS-remote station, if packets are sent simultaneously from the first PS-remote station and the second PS-remote station.

In general, at a base station, consider N remote stations accessing the base station. Out of N remote stations, a particular remote, referred to as the $i^{th}$ remote station, also is accessing the base station. Then the signal-to-noise ratio, at the base station, is related by:

$$\frac{P_{Si}}{P_{Ii}} \cdot \left\{\frac{f_c}{f_{bi}}\right\} = k_i \quad \text{Equation 1}$$

where $P_{si}$ is the power received at the base station from the $i^{th}$ remote station; $P_{Ii}$ is the total interfering power received at the base station, which is interfering with receiving the power $P_{si}$ received at the base station from the $i^{th}$ remote station; $f_c$ is the chip rate; $f_{bi}$ is the data rate transmitted from the $i^{th}$ remote station; $k_i$ is number proportional to the error rate in data from the $i^{th}$ remote station, the probability of error $P_e$ typically is related to $k_i$ by the complementary error function. As $k_i$ decreases, the probability of error, $P_e$, increases in an exponential manner. Consider the minimum number $K_i$ which yields the maximum error rate permissible for receiving data from the $i^{th}$ remote station, then $$k_i \geq K_i \quad \text{Equation 2}$$

The base station knows all $k_i$ and $K_i$ for each remote station. When the base station is lightly loaded, that is, relatively few remote stations are accessing the base station, then $k_i$ is much greater than $K_i$, for each $i^{th}$ remote station. As the number of remote stations accessing the base station increases, the total interfering power $P_{Ii}$ for each $i^{th}$ remote station increases. As the total interfering power $P_{Ii}$ for each $i^{th}$ remote station increases, the ratio $k_i$ for each $i^{th}$ remote station decreases. The decreasing ratio $k_i$ for each $i^{th}$ remote station increases the error rate, until, maximum capacity is reached. At maximum capacity, the interfering power $P_{Ii}$ for each $i^{th}$ remote station is a maximum, since $k_i$ is approximately equal to $K_i$, for at least one particular i.

Different remote stations may require different error rates and also operate at different data rates. Thus, the system is limited by the most sensitive, and vulnerable, remote station.

Equation 1 can be rewritten as a ratio of the energy in the desired $i^{th}$ remote station, at the base station, to the energy in interference in the chip of the desired $i^{th}$ remote station, at the base station:

$$(P_{Si}/f_{bi})/(P_{Ii}/f_c) = k_i \quad \text{Equation 3}$$

Assume that a first power $P_{S1}=10^{-7}$ is received at the base station from a first remote station, and that a second power $P_{S2}=10^{-8}$ is received at the base station from a second remote station. Assume that the total power $P_T$ received at the base station from all remote stations, including the first remote station and the second remote station, is $10^{-6}$–$10^{-8}$ which equals $99 \times 10^{-8}$ which equals $9.9 \times 10^{-7}$. Then, the interfering power $P_{I2}$ for the second remote station equals $10^{-6}$–$10^{-7}$ which equals $9 \times 10^{-7}$. If the first bit rate $f_{b1}$ for the first remote station equals 320 kHz, and the second bit rate $f_{b2}$ for the second remote station equals 3.2 MHz, then $$k_1 = (10^{-7}/320 \text{ kHz})/(9.9 \times 10^{-7}/3.2 \text{ MHz})$$
$$= 10/9.9 \simeq 1.01$$

(which approximately is equal to one).
While:

$$k_2 = (10^{-8}/320 \text{ kHz})/(9.9 \times 10^{-7}/3.2 \text{ MHz})$$
$$= 10/9 \simeq 1.1$$

From the above, the first ratio $k_1$ is more sensitive than the second ratio $k_2$. Depending on the values used in these equations, the vulnerability to error can become more pronounced.

Consider in a particular system that $K_1=4$ and that $K_2=1$. Then remote stations can access the base station, so long as $k_1$ is greater than or equal to 4.

The base station tells each remote station accessing the base station, what maximum power level and data rate is permitted. For example, typically $P_{Si}/f_{bi}$ is a constant since $P_{Si}/f_{bi}$ represents the symbol energy before forward-error-correction (FEC) encoding. Thus, when the base station is telling a remote station what the maximum symbol rate $f_{bi}$ can be sent, the base station also is telling the remote user the maximum power level $P_{Si}$ that can be received at the base station.

From Equation 1, the power level is most important to the base station, since if a particular remote station is attempting to access the base station, and transmits with too much power, then the particular remote station jams the other remote stations at the base station. A remote station desiring to access the base station, whether a CS-remote station or a PS-remote station, when knowing the power limitation, also knows the data rate limitation. This can be simplified by having the base station tell a PS-remote station the data rate the PS-remote station is to use. From the sounding channel, the PS-remote station knows the power level. Closed loop power control is used to control the power receied at the base station, from each remote station.

If a CS-system, by way of example, is designed to handle 100 CS-remote stations, at 32 kb/s, and the power received from each remote station is $P_o$, then $P_{Ii}=99 \times P_o$, and $$k_i=(P_o/99\times P_o)\times(f_c/32\ kb/s)$$

Suppose that one of the interfering remote stations is at the wrong power level, and sends fours times the interfering remote station's authorized power level, $4P_o$, or the interfering remote station transmits with the authorized power level, but four times the authorized power level, $4P_o$, arrives at the base station due to multipath combining or other propagation effect, then $$k_i=(P_o/102\times P_o)\times(f_c/32\ kb/s)$$

This is not much of a change, and the system performance degrades gracefully.

In the present invention, assume that $P_{Si}/f_{bi}$ is constant independent of the chosen data rate. This requirement is not necessary, but easy and may be preferred.

Assume that the base station has a sounding channel. Then the PS-remote station listens to the base station. When the base station tells a particular PS-remote station that the base station has a certain data rate available (i.e. capacity is available), for example, that 2 Mb/s can be sent, then the particular PS-remote station, if the particular PS-remote station has a packet to send, automatically transmits. The time for transmission from the particular PS-remote station can at a random time from being told that capacity is available. The random time may be controlled by a random number generator ro other random device. Alternatively, the time for transmission from the particular remote station need not be random, but may be a preset time from when being told capacity is available.

As soon as the base station receives a bit or two from the particular PS-remote station, then the base station sends a busy (BT) signal, equivalent to a busy tone or packet, so that other PS-remote station do not access the channel.

Suppose that a particular CS-remote station can receive and hears the base station, but only requires 32 kb/s, the particular CS-remote station can use the 32 kb/s by accessing the base station. When the particular CS-remote station accesses the base station, the base station transmits a data rate availability, by way of example, of 2 MB/s−32 kb/s= 1,968 kb/s.

When a PS-remote station accesses the base station, the PS-remote station uses all of the available capacity for a short time, for example, with a 2 Mb/s capacity, the PS-remote station can send 10 kb in five milliseconds.

The present invention is adaptive and utilizes the capacity in the store-and-forward subsystem 341 of the base station efficiently. When the base station is not fully occupied by one or more CS-remote stations, then one packet from a PS-remote station can arrive at a time, without a collision. To accomplish this, busy signal collision avoidance is employed. Thus, as soon as the base station detects an incoming packet, it sends out a busy signal, analogous to a busy tone, indicating there is no available capacity.

Packet switched transmission from multiple PS-remote stations involves random packets, with relatively large time durations in between the transmissions of packets. The present invention requires each PS-remote station to start listening to a base station as soon as the PS-remote station enters the cell of the respective base station. Thus, a PS-remote station turns on in a system, and has nothing to send, the PS-remote station monitors the surrounding base stations for power and capacity. The PS-remote station sends a short identification packet. The base station adds its address to this packet and forwards the packet to the central office. The central office now knows which base station the PS-remote station is near, and where to forward a message intended for that particular PS-remote station.

If the PS-remote station moved and another base station becomes the preferred base station, then the PS-remote station sends an identification signal to this second base station. The second base station adds its address to the packet, and forwards the packet to the central office. The central office now knows that the second base station is being used by the PS-remote station, and to forward a message intended for that particular PS-remote station to the second base station. Thus, the central office always knows the location of each PS-remote station, in its system.

It will be apparent to those skilled in the art that various modifications can be made to the efficient sharing of capacity by remote stations using circuit switching and packet switching of the instant invention without departing from the scope or spirit of the invention, and it is intended that the present invention cover modifications and variations of the efficient sharing of capacity by remote stations using circuit switching and packet switching, provided they come within the scope of the appended claims and their equivalents.

I claim:

1. An improvement to a spread-spectrum, code-division-multiple-access (CDMA) cellular system comprising:

a plurality of circuit-switched (CS) remote stations, each CS-remote station for transmitting a spread-spectrum CDMA signal, with a chip rate of $f_c$, with a CS-symbol rate of $f_b$, and with a respective power level $P_{CSi}$ where i refers to an $i^{th}$ CS-remote station in the plurality of PS-remote stations;

a plurality of packet-switched (PS) remote stations, each PS-remote station for transmitting a spread-spectrum CDMA signal with the chip rate of $f_c$, with a PS-symbol rate $f_p$, and with a power level $P_{PSi}$ where i refers to an $i^{th}$ PS-remote station in the plurality of PS-remote stations; and wherein the power level $P_{PSi}$ from the $i^{th}$ PS-remote station and the power level $P_{CSi}$ from the $i^{th}$ CS-remote station are related by a ratio $P_{PSi}/P_{CSi}$ being approximately equal to $f_p/f_b$.

2. An improvement to a spread-spectrum, code-division-multiple-access (CDMA) cellular system comprising:

a plurality of circuit-switched (CS) remote means, each CS-remote means for transmitting a spread-spectrum CDMA signal, with a chip rate of $f_c$, with a CS-symbol rate of $f_b$, and with a respective power level $P_{CSi}$ where i refers to an $i^{th}$ CS-remote station in the plurality of PS-remote stations;

a plurality of packet-switched (PS) remote means, each PS-remote means for transmitting a spread-spectrum CDMA signal with the chip rate of $f_c$, with a PS-symbol rate $f_p$, and with a power level $P_{PSi}$ where i refers to an $i^{th}$ PS-remote station in the plurality of PS-remote stations; and wherein the power level $P_{PSi}$ from the $i^{th}$ PS-remote means and the power level $P_{CSi}$ from the $i^{th}$ CS-remote means are related by a ratio $P_{PSi}/P_{CSi}$ being approximately equal to $f_p/f_b$.

3. An improvement to a spread-spectrum, code-division-multiple-access (CDMA) cellular method, the improvement comprising the steps of:

transmitting, from a circuit-switched (CS) remote station, a spread-spectrum CDMA signal, with a chip rate of $f_c$, with a CS-symbol rate of $f_b$, and with a power level $P_{CS}$;

transmitting, from a packet-switched (PS) remote station, a spread-spectrum CDMA signal with the chip rate of $f_c$, with a PS-symbol rate $f_p$, and with a power level $P_{PS}$; and wherein the power level $P_{PS}$ from the PS-remote station and the power level $P_{CS}$ from the CS-remote station are related by a ratio $P_{PS}/P_{CS}$ being approximately equal to $f_p/f_b$.

4. An improvement to a spread-spectrum, code-division-multiple-access (CDMA) cellular system having a packet-switched (PS) signals and circuit-switched (CS) signals, comprising:

a base station communicating with a plurality of CS-remote stations;

a CS-remote station for transmitting a spread-spectrum CDMA signal to the base station, with a chip rate of $f_c$, with a CS-symbol rate of $f_b$, and with a power level $P_{CS}$;

a PS-remote station for transmitting a PS-packet, as a spread-spectrum CDMA signal, to the base station, with a chip rate of $f_c$, with a PS-symbol rate $f_p$, and with a power level $P_{PS}$; and said base station, responding to the PS-packet, for sending a BS-packet indicating any of PS-spread-spectrum channel availability, power level, and capacity availability, with the power level $P_{PS}$ from the PS-remote station and the power level $P_{CS}$ from the CS-remote station related by a ratio $P_{PS}/P_{CS}$ being approximately equal to $f_p/f_b$.

5. An improvement to a code-division-multiple-access (CDMA) system having a base station, a plurality of circuit-switched (CS) remote stations communicating with the base station having a plurality of spread-spectrum channels including a multiplicity of CS-channels with spread-spectrum modulation, and a packet-switched (PS) remote station, with the plurality of CS-remote stations using all or less than total available capacity at in the plurality of spread-spectrum channels of said base station, comprising the steps of:

determining, at said PS-remote station, availability of a PS channel;

determining, at said PS-remote station, available capacity in the plurality of spread-spectrum channels of said base station;

determining, at said PS-remote station, available data rate for data transmission;

determining, at said PS-remote station, a particular chip-sequence signal to be used for the available PS-channel; and transmitting, using radio waves, to said base station, in response to determining the availability of a PS channel, the available capacity, the available data rate, and the particular chip-sequence signal, a packet having data, with the packet transmitted on the PS channel using all or less than the available capacity and with a particular data rate equal or less than the available data rate, and with the packet having the particular chip-sequence signal.

6. The improvement to the spread-spectrum, CDMA cellular method as set forth in claim 5, with the step of determining the availability of the PS channel including the steps of determining, at said base station, the availability of the PS channel and transmitting, from said base station, information including the available PS channel to said PS-remote station.

7. The improvement to the spread-spectrum, CDMA cellular method as set forth in claim 5, with the step of determining available capacity including the steps of determining, at said base station, available capacity, and transmitting, from said base station, information including the available capacity to said PS-remote station.

8. The improvement to the spread-spectrum, CDMA cellular method as set forth in claim 5, with the step of determining available data rate including the steps of determining, at said base station, the available data rate, and transmitting, from said base station, information including the available data rate to said PS-remote station.

9. The improvement to the spread-spectrum, CDMA cellular method as set forth in claim 5, with the step of determining the particular chip-sequence signal including the steps of determining, at said base station, the particular chip-sequence signal, and transmitting, from said base station, information including the particular chip-sequence signal to said PS-remote station.

10. An improvement to a spread-spectrum, code-division-multiple-access (CDMA) cellular method having a base station, a plurality of circuit-switched (CS) remote stations communicating with the base station having a plurality of spread-spectrum channels including a multiplicity of CS-channels with spread-spectrum modulation, and a plurality of packet-switched (PS) remote stations with a particular PS-remote station, with the plurality of CS-remote stations using all or less than total available capacity at in the plurality of spread-spectrum channels of said base station, comprising the steps of:

determining, at said particular PS-remote station, availability of a PS channel;

determining, at said particular PS-remote station, available capacity in the plurality of spread-spectrum channels of said base station;

determining, at said particular PS-remote station, a power level for packet transmission;

determining, at said particular PS-remote station, a particular chip-sequence signal to be used for the available PS-channel; and transmitting, using radio waves, to said base station, in response to determining the availability of a PS channel, the available capacity, the power level, and the particular chip-sequence signal, a packet having data, with the packet transmitted on the PS channel using all or less than the available capacity and with the power level, and with the packet having the particular chip-sequence signal.

11. The improvement to the spread-spectrum, CDMA cellular method as set forth in claim 10, with the step of determining the availability of the PS channel including the steps of determining, at said base station, the availability of the PS channel and transmitting, from said base station, information including the available PS channel to said PS-remote station.

12. The improvement to the spread-spectrum, CDMA cellular method as set forth in claim 10, with the step of determining available capacity including the steps of determining, at said base station, available capacity, and transmitting, from said base station, information including the available capacity to said PS-remote station.

13. The improvement to the spread-spectrum, CDMA cellular method as set forth in claim 10, with the step of determining available data rate including the steps of determining, at said base station, the available data rate, and transmitting, from said base station, information including the available data rate to said PS-remote station.

14. The improvement to the spread-spectrum, CDMA cellular method as set forth in claim 10, with the step of determining the particular chip-sequence signal including the steps of determining, at said base station, the particular chip-sequence signal, and transmitting, from said base station, information including the particular chip-sequence signal to said PS-remote station.

15. The improvement to the spread-spectrum, CDMA cellular system as set forth in claim 10, with the step of determining the power level including the steps of determining, from a channel-sounding signal transmitted from said base station to said PS-remote station, the power level.

16. An improvement to a spread-spectrum, code-division-multiple-access (CDMA) cellular system comprising:
   a base station having a plurality of spread-spectrum channels including a multiplicity of CS-channels with spread-spectrum modulation;
   a plurality of circuit-switched (CS) remote stations communicating on the multiplicity of CS-channels with the base station, with the plurality of CS-remote stations using all or less than total available capacity in the plurality of spread-spectrum channels of said base station;
   a packet-switched (PS) remote station for determining, availability of a PS channel, for determining available capacity in the plurality of spread-spectrum channels of said base station, for determining available data rate for data transmission, and for determining a particular chip-sequence signal to be used for the available PS-channel; and
   said PS-remote station for transmitting, using radio waves, to said base station, in response to determining the availability of a PS channel, the available capacity, the available data rate, and the particular chip-sequence signal, a packet having data, with the packet transmitted on the PS channel using all or less than the available capacity and with a particular data rate equal or less than the available data rate, and with the packet having the particular chip-sequence signal.

17. The improvement to the spread-spectrum, CDMA cellular system as set forth in claim 16, with said base station for determining the availability of the PS channel and for transmitting information including the available PS channel to said PS-remote station.

18. The improvement to the spread-spectrum, CDMA cellular system as set forth in claim 16, with said base station for determining available capacity, and for transmitting information including the available capacity to said PS-remote station.

19. The improvement to the spread-spectrum, CDMA cellular system as set forth in claim 16, with the said base station for determining the available data rate, and for transmitting information including the available data rate to said PS-remote station.

20. The improvement to the spread-spectrum, CDMA cellular system as set forth in claim 16, with said base station for assigning the particular chip-sequence signal, and for transmitting information including the particular chip-sequence signal to said PS-remote station.

21. An improvement to a spread-spectrum, code-division-multiple-access (CDMA) cellular system comprising:
   a base station having a plurality of spread-spectrum channels including a multiplicity of CS-channels with spread-spectrum modulation;
   a plurality of circuit-switched (CS) remote stations communicating on the multiplicity of CS-channels with the base station, with the plurality of CS-remote stations using all or less than total available capacity in the plurality of spread-spectrum channels of said base station;
   a packet-switched (PS) remote station for determining availability of a PS channel, for determining available capacity in the plurality of spread-spectrum channels of said base station, for determining a power level for packet transmission, and for determining a particular chip-sequence signal to be used for the available PS-channel; and
   said PS-remote station for transmitting, using radio waves, to said base station, in response to determining the availability of a PS channel, the available capacity, the power level, and the particular chip-sequence signal, a packet having data, with the packet transmitted on the PS channel using all or less than the available capacity and with the power level, and with the packet having the particular chip-sequence signal.

22. The improvement to the spread-spectrum, CDMA cellular system as set forth in claim 21, with said base station for determining the availability of the PS channel and for transmitting information including the available PS channel to said PS-remote station.

23. The improvement to the spread-spectrum, CDMA cellular system as set forth in claim 21, with said base station for determining available capacity, and for transmitting information including the available capacity to said PS-remote station.

24. The improvement to the spread-spectrum, CDMA cellular system as set forth in claim 21, with the said base station for determining the available data rate, and for transmitting information including the available data rate to said PS-remote station.

25. The improvement to the spread-spectrum, CDMA cellular system as set forth in claim 21, with said base station for assigning the particular chip-sequence signal, and for transmitting information including the particular chip-sequence signal to said PS-remote station.

26. The improvement to the spread-spectrum, CDMA cellular system as set forth in claim 21, with said base station for transmitting, to said PS-remote station, a channel-sounding signal, and with said PS-remote station for determining the power level from the channel-sounding signal.

27. An improvement to a spread-spectrum, code-division-multiple-access (CDMA) cellular method having a base station, a plurality of circuit-switched (CS) remote stations, with a particular CS-remote station for transmitting a spread-spectrum CDMA signal to the base station, with a chip rate of $f_c$, with a CS-symbol rate of $f_b$, and with a power level $P_{CS}$, the plurality of CS-remote stations communicating with the base station having a plurality of spread-spectrum channels including a multiplicity of CS-channels with spread-spectrum modulation, and a plurality of packet-switched (PS) remote stations with a particular PS-remote station (PS) remote station for transmitting a spread-spectrum CDMA signal to the base station, with a chip rate of $f_c$, with a PS-symbol rate of $f_p$, and with a power level $P_{PS}$, with the plurality of CS-remote stations using all or less than total available capacity in the plurality of spread-spectrum
   determining, at said particular PS-remote station, a power level for packet transmission; and
   transmitting from said particular PS-remote station, using radio waves, to said base station, in response to determining the power level, a packet having data, with the packet transmitted with the power level $P_{PS}$ from the PS-remote station and the power level $P_{CS}$ from the CS-remote station equal or less than a ratio $P_{PS}/P_{CS}$, with the ratio $P_{PS}/P_{CS}$ being approximately equal to $f_p/f_b$.

28. The improvement to the spread-spectrum, CDMA cellular method as set forth in claim 27, further including the steps of determining, at said base station, an availability of a PS channel and transmitting, from said base station, information including the available PS channel to said PS-remote station.

29. The improvement to the spread-spectrum, CDMA cellular method as set forth in claim 27, further including the steps of determining, at said base station, available capacity, and transmitting, from said base station, information including the available capacity to said PS-remote station.

30. The improvement to the spread-spectrum, CDMA cellular method as set forth in claim 27, with the steps of determining the power level including the steps of determining, at said base station, the power level, and transmitting, from said base station, information including the power level to said PS-remote station.

31. The improvement to the spread-spectrum, CDMA cellular method as set forth in claim 27, further including the steps of determining, at said base station, a particular chip-sequence signal, and transmitting, from said base station, information including the particular chip-sequence signal to said PS-remote station.

32. The improvement to the spread-spectrum, CDMA cellular method as set forth in claim 27, with the step of determining the power level including the steps of determining, from a channel-sounding signal transmitted from said base station to said PS-remote station, the power level.

33. An improvement to a spread-spectrum, code-division-multiple-access (CDMA) cellular m system comprising:

a base station having a plurality of spread-spectrum channels including a multiplicity of circuit-switched (CS) channels with spread-spectrum modulation;

a plurality of CS-remote stations communicating on the multiplicity of CS-channels with the base station, with the plurality of CS-remote stations using all or less than total available capacity in the plurality of spread-spectrum channels of said base station, with a particular CS-remote station for transmitting a spread-spectrum CDMA signal to the base station, with a chip rate of $f_c$, with a CS-symbol rate of $f_b$, and with a power level $P_{CS}$;

a packet-switched (PS) remote station for transmitting a spread-spectrum CDMA signal to the base station, with a chip rate of $f_c$, with a PS-symbol rate $f_p$, and with a power level $P_{PS}$, the PS-remote station for determining a power level for packet transmission; and said PS-remote station for transmitting, using radio waves, to said base station, in response to determining the power level, a packet having data, with the power level $P_{PS}$ from the PS-remote station and the power level $P_{CS}$ from the CS-remote station equal or less than a ratio $P_{PS}/P_{CS}$, with the ratio $P_{PS}/P_{CS}$ being approximately equal to $f_p/f_b$.

34. The improvement to the spread-spectrum, CDMA cellular system as set forth in claim 33, further including said base station for determining an availability of a PS channel and for transmitting information including the available PS channel to said PS-remote station.

35. The improvement to the spread-spectrum, CDMA cellular system as set forth in claim 33, further including said base station for determining available capacity, and for transmitting information including the available capacity to said PS-remote station.

36. The improvement to the spread-spectrum, CDMA cellular system as set forth in claim 33, further including said base station for determining the available data rate, and for transmitting information including the available data rate to said PS-remote station.

37. The improvement to the spread-spectrum, CDMA cellular system as set forth in claim 33, further including said base station for assigning the particular chip-sequence signal, and for transmitting information including the particular chip-sequence signal to said PS-remote station.

38. The improvement to the spread-spectrum, CDMA cellular system as set forth in claim 33, with said base station for transmitting, to said PS-remote station, a channel-sounding signal, and with said PS-remote station for determining the power level from the channel-sounding signal.

* * * * *